United States Patent [19]
Sowman

[11] 3,793,041
[45] Feb. 19, 1974

[54] REFRACTORY FIBERS OF ZIRCONIA AND SILICA MIXTURES

[75] Inventor: Harold G. Sowman, Maplewood, Minn.

[73] Assignee: Minnesota Mining and Manufacturing Company, St. Paul, Minn.

[22] Filed: Aug. 2, 1971

[21] Appl. No.: 168,298

Related U.S. Application Data

[62] Division of Ser. No. 825,273, May 16, 1969, Pat. No. 3,709,706.

[52] U.S. Cl. ................................................. 106/57
[51] Int. Cl. ............................................ C04b 35/48
[58] Field of Search .................................... 106/57

[56] References Cited
UNITED STATES PATENTS

3,082,099   3/1963   Beasley et al. ........................ 106/57
3,311,481   3/1967   Sterry et al. .......................... 106/57

*Primary Examiner*—James E. Poer
*Attorney, Agent, or Firm*—Alexander, Sell, Steldt & Delahunt

[57] ABSTRACT

Refractory fibers of zirconia and silica mixtures are made by shaping and dehydratively gelling, for example by extruding in air, an aqueous mixture of a zirconium compound, such as zirconium diacetate, and colloidal silica, and heating the resulting gelled fiber in a controlled manner to decompose and volatilize undesired constituents and convert the fiber to a refractory fiber having a desired microstructure and useful to form refractory fabrics, reinforced composites, heat or sound insulation, filter or adsorption media, etc.

21 Claims, 4 Drawing Figures

PATENTED FEB 19 1974 3,793,041

INVENTOR.
HAROLD G. SOWMAN
BY Kinney, Alexander,
Sell, Steldt & DeLaHunt
ATTORNEYS

REFRACTORY FIBERS OF ZIRCONIA AND SILICA MIXTURES

This application is a division of copending application, Ser. No. 825,273, filed May 16, 1969, now U.S. Pat. No. 3,709,706.

This invention relates to refractory material or articles of zirconia and silica mixtures, such as fibers as well as to articles made therefrom, such as textiles, or articles resulting from the association of such refractory material with other materials, such as composites containing such refractory material as reinforcement. In another aspect, it relates to transparent, strong, flexible, continuous, round, smooth, and glossy fibers of a mixture of zirconia and silica, which can be internally colored, which fibers can be used as composite reinforcement or to make refractory articles such as fabrics. In another aspect, it relates to a process for the preparation of such refractory fibers.

Synthetic refractory metal oxide articles have been made from melts for a long time and more recently by vapor deposition. The latter process has been used to a limited extent to make small quantities of relatively short alumina and beryllia fibers (as well as boron fibers), but with the present state of the art, such products are expensive and difficult to obtain. Silica fibers are also now obtainable, though they are relatively expensive and lose strength at high temperatures, such fibers being made by melt processes or by leaching and heat treating borosilicate glass. Refractory articles made from melts, such as sheet glass and glass fiber, have enjoyed wide-spread use, but their application has been limited by their fragility and brittleness and their relatively low melting or softening points. The relative proportions of inorganic oxide materials which can be used in such melt processes to make useful articles are limited, and the melt processes themselves have the disadvantage of requiring the use of high temperatures to melt the components and costly equipment to handle the melts. For example, the production of glass fiber requires high temperature melting furnaces, heated bushings, and special crucibles.

Within the last decade, a number of patents have issued and other literature published describing various polycrystalline, microcrystalline, or non-vitreous fibers and other shaped articles of refractory metal oxides made by various non-melt processes, such as by drying films of solutions of oxygen-containing metal compounds, or drying organic polymeric bodies, such as cellulose or rayon, impregnated with such a solution, or by extruding and drawing, or spinning, viscous fluids of such materials into fibers, followed by heating to remove water and organic material and by firing at high temperatures to produce a refractory article. A recent review of the state of the art on polycrystalline inorganic fibers appears in "Modern Composite Materials", edited by Brautman and Krock, published by Addison-Wesley Pub. Co., Reading, Mass. (1967). An earlier article describing commercial zirconia polycrystalline fibers is found in "Ceramic Industry Magazine", April, 1965, p. 120, and a relatively recent developmental product bulletin describing yttria-stabilized zirconia fibers and textiles in Bulletin No. CER-101, April, 1968, of the Union Carbide Corp., N. Y. U.S. patents which have issued in this area are U.S. Pat. Nos. 3,082,099 (Beasley et al.), 3,180,741 (Wainer et al.), 3,311,481 (Sterry et al.) 3,311,689 (Kelsey), 3,322,865 (Blaze) and 3,385,915 (Hamling).

The above-cited published literature and patents describe various metal oxide refractory materials and their preparation, including shaped articles, such as fibers of zirconia. It is well known that calcined, unstabilized zirconia exists in different temperature dependent crystalline modifications. Monoclinic zirconia is the form that is stable up to about 1,000 to 1,150°C. From 1,000° to 2285°C., the stable form is tetragonal, while above 2,285°C. only the cubic form is stable. If monoclinic zirconia is heated at about 1,150°C., it undergoes a transformation to the tetragonal form, this transformation being accompanied by a radical volume contraction (about 9 percent), and on cooling it transforms again, and shaped articles, such as fibers, are weakened or broken when cycled through the 1,000° to 1150°C. temperature range. Thus, in all zirconia materials which are to be made or which are to be used or fired at temperatures above 1,000°C. it has been necessary to stabilize the crystal structure against the reversible transformation from the room temperature monoclinic form to the high temperature tetragonal form.

Stabilization of zirconia has been sought by the use of certain stabilizing materials or additives, such as calcia, magnesia, neodymia, and yttria. Small stabilizing amounts of silica have also been used to stabilize zirconia in its cubic form and produce non-vitreous fibers consisting of 5–15 weight percent $SiO_2$ and 95–85 weight percent $ZrO_2$, as disclosed by U.S. Pat. No. 3,082,099. U.S. Pat. No. 3,311,481 discloses polycrystalline refractory fibers of high moduli prepared by fiberizing an aqueous solution having a viscosity between 15,000 and 40,000 cps and containing zirconium diacetate, silica, and acetic acid, and drying and then firing the fibers at successively higher temperatures, including 1,800°–2000°F. for 2 hrs. Zircon (zirconium silicate, having the formula $ZrSiO_4$, sometimes written as $(ZrO_2 \cdot SiO_2)$ is of course a chemical compound rather than a mixture of zirconia and silica in their free or uncombined forms, and it has a tetragonal crystalline form or structure, and articles made of zircon, though strong, are not flexible.

Inorganic or metal oxide fibers and other shaped articles are still relatively in the early stage of development and high temperature technology today has a need for a relatively inexpensive refractory product with desirable physical properties that can be maintained at high temperatures.

Briefly, the refractory fibers of this invention comprise a solid homogeneous mixture comprising microcrystalline zirconia and amorphous silica, each of these components being present in their uncombined or free form as separate $ZrO_2$ and $SiO_2$ phases. As such, these fibers cannot be classified either as polycrystalline or as amorphous, but rather are a mixture of these two types of materials. Such fibers preferably have the zirconia crystallites predominantly present in the tetragonal form (readily discernible by its characteristic X-ray diffraction pattern) as a result of firing the article in air at about 900° to 1,150°C., or have the zirconia present in another crystalline form, such as cubic, which is irreversibly transformable to said tetragonal form when so fired. Such fibers are refractory, essentially chemically resistant, transparent, and strong. The fibers have significantly high elastic moduly but yet low enough, e.g. below $25 \times 10^6$ psi, so as to be quite flexible. (The term "fiber" is used herein in the sense of a monofilament which has a length-to-diameter ratio greater than 500 and as such can be though of as a continuous fiber or one of indeterminate or infinite length.)

The above-described refractory fibers in their green or unfired form can be made by shaping and dehydrative or evaporative gelling, e.g. by extruding, drawing, spinning, or blowing, or combinations thereof, a viscous concentrate of an aqueous solution of an oxygen-containing zirconium compound, such as zirconium diacetate containing colloidal silica. The shaped "green" fibers are then heated to remove further water, volatilize or decompose organic material, and burn off carbon, and convert the fibers into a monolithic refractory comprising the above-described mixture of microcrystalline zirconia and amorphous silica.

The refractory fibers of this invention can be used for a variety of purposes, particularly where high temperature stability is desired or required. For example, fibers of such refractory material can be fabricated into woven, felted, or knitted textiles and used for heat-resistant upholstery or clothing, and for other purposes where thermal stability is desirable or required. Such articles can be fabricated into textiles which are brilliantly internally colored with inorganic colorants and used to make decorative clothing, draperies, wall covering, and the like. Such articles can also be used as reinforcement for plastic, elastomeric, metal, or ceramic composites and as sound suppression material or as filtering or adsorptive material. The fibers also can be processed into light-weight insulation, paper, batting, and the like and used to insulate furnaces and other heating or high temperature equipment.

In the accompanying drawing, the various figures are pen-and-ink sketches drawn to the same scale of photomicrographs taken in all cases with a light or optical microscope excepting FIG. 5, in which a scanning electron microscope was used.

Figure 1:
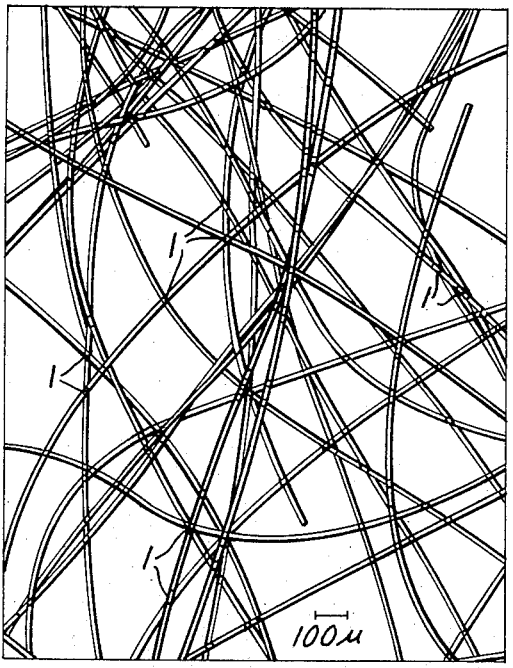
FIG. 1 represents transparent fibers, photographed at 50X with transmitted light, obtained by firing at 1,000°C. fibers comprising $1ZrO_2:1SiO_2:0.06Fe_2O_3$.

The composition from which the refractory product of this invention can be formed is a two-phase system comprising an aqueous mixture of a colloidal dispersion of silica and an oxygen-containing zirconium compound which can be calcined to zirconia. The silica component is preferably preseent in the amount of at least 0.5 mole and less than 3 moles, per equivalent mole of $ZrO_2$ present. Generally, the two components or materials (the sole essential refractory precursor constituents) are present in the mixture in amounts sufficient to provide an equivalent $ZrO_2:SiO_2$ mole ratio in the aqueous dispersion in the range of 2:1 to 1:3, preferably 1.5:1 to 1:2, and more preferably 1:1. Mole ratios higher than 1.5:1 generally will result in green articles which are difficult to fire to a transparent, clear refractory, while solutions with mole ratios lower than 1:2 are generally difficult to fiberize into green fibers. The particular mole ratio of these components in the refractory product will be the same as that of the aqueous dispersion, e.g. a $1ZrO_2:1SiO_2$ refractory article is produced from an aqueous dispersion having an equivalent mole ratio of $1ZrO_2:1SiO_2$.

The dispersion can be prepared by simply admixing an aqueous colloidal dispersion or aquasol of silica with an aqueous solution of the zirconium compound, preferably by adding the dispersion of silica to the latter solution with mixing in order to obtain a uniform dispersion with formation of a gel, floc or precipitate. The pH of the resulting dispersion will be inherently low or on the acid side if the zirconium compound is an acid salt, such as zirconium diacetate, e.g. 3 to 5 and typically 3.5 to 4, and though a heat fugitive acid, such as acetic acid, can be added to maintain a low pH and prevent premature gelling, such acid addition isn't necessary and may be undesirable in that the subsequently formed green article when fired to form a refractory may tend to be black or gray rather than water-clear, depending on the firing schedule or conditions. It is also within the scope of this invention to add heat fugitive organic viscosifying or thickening agents to the dispersion where the particular aqueous solution of the zirconium compound is a solution of an inorganic zirconium compound like zirconium sulfate or zirconium oxychloride, such viscosifying agents, e.g. polyvinylpyrrolidone, polyvinyl alcohol, methylcellulose, and glucose, being oxidized and removed during the firing of the green articles produced from such dispersions.

The zirconium compound can be used in the form of an aqueous solution of a suitable organic or inorganic acid water-soluble salt, such as the zirconium salts of aliphatic or acyclic mono- or dicarboxylic acids having dissociation constant of at least $1.5 \times 10^{-5}$, such as formic, acetic, oxalic, maleic, adipic, itaconic, citric, tartaric, and lactic acids, and their halogenated derivatives such as chloroacetic acid, the zirconium diacetate being presently preferred because of its compatibility with colloidal silica and commercial availability and relatively low cost of its aqueous solution. An especially useful aqueous zirconium diacetate solution which can be used in this invention is one that is commercially available (see National Lead Co., Tam Division, Bulletin D-64) with a pH of 3.8 to 4.2, a specific gravity of about 1.33, and an equivalent of 22 weight percent $ZrO_2$, the zirconium salt having the formula $H_2ZrO_2(CH_3COO)_2$, and sometimes named as diacetatozirconic acid. Typical inorganic zirconium salts which can be used are zirconium sulfate, zirconium nitrate, zirconium oxychloride, zirconium carbonate, and the like. Zirconia itself can be used in the form of an aquasol or aqueous colloidal dispersion of zirconia, and when mixed with the silica aquasol will form an aqueous dispersion of colloidal $ZrO_2$ as well as colloidal $SiO_2$. Since hafnia is commonly associated in nature with zirconia, commercially available zirconium compounds or aqueous solutions thereof normally will contain about 1 weight percent equivalent hafnia, and this oxide will normally be present in the refractory products of this invention in a corresponding small or trace amount. Other impurities may be present in the refractory article, but the total amount of such impurities will be less than 1 weight percent.

The silica aquasol or aqueous dispersion of colloidal silica can be used with $SiO_2$ concentrations of 1 to 50 weight percent, preferably 15 to 35 weight percent, the latter concentrated dispersions being preferred because of their commercial availability and because if used, the amount of water that has to be removed from the resulting mixture in order to viscosify it will be less than if a more dilute dispersion is used. However, the colloidal silica can be used in the form of an organosol, the silica being colloidally dispersed in such water-miscible, polar organic solvents as normal or isopropyl alcohol, ethylene glycol, dimethylformamide, and various Cellosolve glycol ethers as methyl Cellosolve (2-methoxyethanol). The size of the colloidal silica particles in the aquasols or organosols can vary, e.g. from 1 to 100 m$\mu$, but generally will be on the order of 5 to 30 m$\mu$, preferably about 10 to 16 m$\mu$.

Preferred aqueous colloidal silica dispersions which can be used in this invention are those sold under the trademark "Ludox" (see duPont's Bulletin A-56681 on Ludox Colloidal Silica). Other useful silica dispersions are Nalco 1030, Nalco D-2139, and Syton 200 (the latter being less preferred because of the tendency for the dispersion to foam excessively during concentration). The table below sets forth the properties of various technical grades of aqueous colloidal dispersions of silica which can be used. In some cases it may be desirable to filter the silica dispersion to remove extraneous solids, bacterial growth and other materials.

| Colloidal Silica product | Particle size, m$\mu$ | SiO$_2$ wt. % | pH (at 25°C.) |
|---|---|---|---|
| Ludox HS-40 | 13-14 | 40.1 | 9.54 |
| Ludox HS | 13-14 | 30.1 | 9.8 |
| Ludox LS | 15-16 | 30.1 | 8.3 |
| Ludox SM-15 | 7-9 | 15.0 | 8.5 |
| Ludox SM-30 | 7-8 | 29-31 | 9-10 |
| Ludox TM | 22-25 | 49.0 | 8.5 |
| Ludox AS | 13-14 | 30.1 | 9.4 |
| Ludox AM | 13-14 | 30.1 | 8.8 |
| Nalco 1030 | 11-16 | 30.0 | 10.2 |
| Nalco D-2139 | 5 | 25.0 | 10 |
| Syton 200 | 16 | 29.5 | 9.1 |

The aqueous mixture of colloidal silica and zirconium compound can also contain various other oxygen-containing water soluble metal compounds which will impart a desired internal color to the final refractory upon being converted or oxidized to the corresponding metal oxide. For example, ferric nitrate can be added to impart a red to orange to gold color, chromium diformate or chloride to impart a green color, cobalt acetate or chloride to impart a blue color, calcium formate to impart a yellow color, nickel acetate to impart a light yellow color, and copper chloride to impart a light green. The ferric oxide-containing refractory can be reduced in a hydrogen atmosphere, the resulting reduced iron oxide or iron imparting a black color to the refractory and making it attractive to a magnet but not electrically conductive. (Such refractory can be used to make composite ceramics useful in electrical equipment, such as coils, plates, rotors, magnetic circuitry, etc.) The amount of such coloring additive will vary depending upon the tone of the color or hue desired, but generally will be an amount in the range of 0.5 to 10 or 25 weight percent, preferably 1 to 5 weight percent expressed as the metal oxide, e.g. Fe$_2$O$_3$, based on the combined weight of the zirconia and silica in the refractory article. High amounts of some coloring additives may result in refractory articles with less transparency and lower tensile strength, but even such lower tensile strength will be appreciably high, e.g. 100,000 psi or higher. Other coloring additives, even in small amounts, will cause opacity in the resulting refractory. Metal oxide precursors can also be added to adjust refractive index.

The aqueous mixture of colloidal silica and zirconium compound, as prepared, will be a relatively dilute liquid, generally containing about 15 to 30 weight percent equivalent solids. For the preparation of shaped articles such as fibers, it is necessary to concentrate or viscosify this dilute liquid in order to convert it to a viscous or syrupy fluid concentrate which will readily gel when the concentrate is formed into a shaped article and dehydrated, for example when the concentrate is extruded and drawn in air. The concentration step can be carried out by technique known in the art, which generally involve evaporation to remove large amounts of water and any volatile gases. Such evaporation can be carried out at ambient temperature and pressures, but preferably is carried out or finished under vacuum, such as that generated by a water aspirator. Such evaporation can be carried out in a flask wholly or partly submersed in a water bath having a temperature, for example of 30° to 70°C.; the liquid undergoing vacuum concentration in the flask will, of course, be cooler than this temperature, e.g. 0° to 10°C. Suitable apparatus for concentrating the liquid is a Rotovapor flask partly submersed in a water bath and connected to a water aspirator. It is not necessary to heat the dispersion at any time during the concentrating step or after the desired viscosity is obtained; the preparation and dehydrative gelling of the concentrate can be carried out at ambient room temperature. Sufficient concentration will be obtained when the solids content is generally in the range of 40 to 55, preferably 45 to 50 weight percent, and viscosities (Brookfield at ambient room temperature) in the range of 15,000 to 1,000,000 cps, preferably 45,000 to 500,000 cps., depending on the type of dehydrative gelling technique and apparatus used and the desired shape of the gelled article. Too high a viscosity may be prohibitive for the particular equipment used to extrude the concentrate. The viscous concentrates are relatively stable and won't crystallize, and do not have to be freshly prepared for use, though the viscosity tends to increase on standing. The viscous concentrates have capability of being diluted with water to dilute dispersions having the same appearance and apparent composition and properties as the initial starting dispersion. If the dispersion is concentrated to a viscosity which is too high to readily form desired shaped articles, it can be diluted with water (and concentrated again if desired) to a workable viscosity. It, of course, is not concentrated to the extent where the solubility of the zirconium compound is exceeded to the point where macrocrystals are formed. Prior to dehydrative gelling, the concentrate can be centrifuged to remove air bubbles and/or filtered to remove extraneous solid material, bacterial growth, etc. The particular solids content or viscosity used for dehydrative gelling will be dependent on the particular apparatus and conditions used to form shaped articles form the viscous concentrate. For example, when the viscous concentrate is extruded under pressure, e.g. 50 to 1,000 psi., using a conventional stainless steel spinnerette, with a plurality of orifices (e.g. 15 to 100 or more 1 to 10-mil orifices), such as used in the rayon industry, the viscosity of the concentrate should be such that fibers are formed in a continuous manner without blocking or plugging of spinnerette orifices or breaking of the extruded fiber as it is formed or during handling, e.g. during spooling.

The viscous concentrate can be extruded through orifices and allowed to fall in air by the force of gravity or drawn mechanically in air by means of rolls or a drum or winding device rotating at a speed faster than the rate of extrusion, or the concentrate can be extruded through orifices from a stationary or rotating head and blown by parallel, oblique of tangential streams of air, such as in the making of cotton candy, the blown fibers being collected on a screen or the like in the form of a mat. Any of these forces exerted on the extruded fibers, e.g. gravity, drawing, or air streams, cause attenuation or stretching of the fibers, reducing their cross-sectional area by about 50 to 90 percent andd increasing their length by about 100 to 1,000 percent and serve to hasten or aid the drying of the fibers.

The dehydrative gelling of the article is most conveniently carried out in ambient air, though heated air can be used if desirable or necessary to obtain fast drying. The relative humidity (RH) of such air should not be too high, since large amounts of moisture will cause the gelled or shaped green articles to stick together. Generally, relative humidity in the range of 20 to 60 percent can be used, at temperatures of 60° to 85°F. If the humidity is high and must be tolerated, compensations can be made by using a concentrate with a higher viscosity, extruding at a lower rate, using a lower drawing rate, using a smaller extrusion orifice, exposing the green articles to a heat lamp as they are formed, and/or increasing the distances between the extrusion orifice and the point where the individual extruded articles come into contact. Sizing of the green fibers before they come into contact, e.g. to form strand of multifibers, will also lessen their tendency to stick together in a high humidity atmosphere. Where a size is used, the extruded fibers can be mechanically drawn over a size applicator, like that used in the textile industry, and a conventional heat fugitive size or lubricant, such as an oil, applied. Heat lamps or the like can be used to volatilize the size so as to avoid combustion of the size when the green articles are fired, such combustion tending to cause overheating of the articles (i.e., the temperature caused by combustion may be higher than the desired firing temperature). The size may also require longer firing to completely remove it from the fired article. On the other hand, if the relative humidity is too low, e.g. 10 to 15 percent, or lower, the green articles may dry too fast and they will tend to break or fracture during spinning or handling before they can be fired. Low humidity conditions can be compensated for by extruding at a faster rate, drawing the extruded article at a faster rate, using larger extrusion orifices, decreasing the distance between the orifices and the point where the articles come into contact, and/or using concentrates with lower equivalent solids content or lower viscosities. Air currents should be minimized because they may cause the individual extruded articles to come into contact before they are sufficiently dry. In any event, the extruded or otherwise gelled articles should be made or handled under conditions which will prevent or minimize their contact with one another before they are sufficiently dry.

Further detail on the shaping of articles from the viscous concentrate will be omitted here in the interest of brevity since such shaping procedures are well known, reference being made to the aforementioned citations, including Chapter 8 of said "Modern Composite Materials" text which illustrates and describes apparatus which can be used in this invention to form fibers from viscous concentrates.

The fibers in the "green" or unfired gel form, as well as other shaped gelled articles fabricated from the viscous concentrate, generally comprise about 60 to 80 weight percent equivalent solids and are dry in the sense that they do not adhere or stick to one another or other substrates and feel dry to the touch, but they still do contain substantial amounts of water and organic material, e.g., 20 to 40 percent, and it is necessary to dry and then heat or fire the articles in order to remove further water and organic material and convert the articles into refractory articles comprising a mixture of zirconia and silica. The terms "dehydrative gelling" or "evaporative gelling", as used herein, therefore does not mean that all the water in the shaped article is removed and does not mean the crystals are formed. Thus, in a sense, this step can be called partial dehydrative gelling. It may be noted at this point that the shaped articles in their green form are transparent and clear under an optical microscope; and unless coloring additives are included in the viscous concentrate, they appear to look like colorless glass fiber. These green fibers, as well as other solidified gel articles (such as microspheres and flakes) of this invention in their green form, are composed of a dispersion of amorphous silica particles (in colloidal size) in an amorphous matrix. This was established by electron microscopy of a dry thin film of the initially prepared dispersion of colloidal silica in aqueous zirconium diacetate, the film having been prepared by dipping a nickel or platinum screen in the initially prepared dispersion (in dilute or unconcentrated form) and then drying the wet screen in air.

In order to remove the balance of water and organic material from the green or solidified gel articles, they are heated in an electric furnace, kiln, or the like in air, oxygen, or other oxidizing atmosphere, at moderately high temperature of about 500°–550°C., or even as high as 900°C. if desired. The green fibers can be heated in the form of individual fibers collected in an irregular or random order, or, preferably, in the form of a spool of strands (a plurality of untwisted, parallel-aligned fibers), or in the form of hanks (a bunch of strands), or they can be chopped in the form of stables and fired in that manner. Also, the green strands or fibers, preferably twisted in the form of yarn, can be woven to form a cloth and heated in the latter form to remove water and undesired constituents. In firing the green articles, care should be exercised to avoid ignition of the articles, so as to prevent or minimize the formation of opaque, fragile articles. If the green articles are not to be fired immediately or soon after their formation, they preferably should be stored in a relatively dry atmosphere to prevent them from picking up moisture and sticking together.

As confirmed by thermal gravimetric and differential thermal analyses, the heating step volatilizes the balance of the water, decomposes and volatilizes organic material, and burns off carbon, the resultant article being a carbon-free monolithic refractory. This heating step also causes some shrinking of the article, the amount of linear shrinkage being generally 25 percent or more, and the volume shrinkage being generally 50 percent or more. However, the shape of the article during firing remains intact; for example, fibers when so fired are still of essentially continuous length. Rather than firing the green articles in air to remove water and organic material, they can be heated in an autoclave in an inert atmosphere (e.g., 100 to 2,000 psi, helium, argon, nitrogen), for example at 300° to 500°C., in order to increase their porosity. Then, they can be refired in air to remove carbon, e.g. at 500° to 900°C., and convert them into a refractory free of carbon.

The refractory materials fired at 500° to 900°C. have desirable properties and may be used as such without further heating. Fibers so fired are still transparent and clear under an optical microscope and will generally have densities in the range of 3.0 to 3.75 g/cc., (or as low as 2 g/cc. if autoclaved in an inert atmosphere) with diameters in the range of 10 to 40 $\mu$, tensile strengths (at break) of 25,000 to 160,000 psi, usually 35,000 to 75,000 psi, and elasticity moduli (Young's modulus) in the range of 5 to $18 \times 10^6$ psi, usually 7 to $10 \times 10^6$ psi.

Electron microscopy with a resolution of about 10 Angstroms reveals that these 500° to 900°C.-fired refractory articles comprise a homogeneous mixture of discernible microcrystals and amorphous material. X-ray diffraction identifies zirconia as the sole diffracting crystallite species with crystallite sizes in the order of 200 to 400 Angstroms (based on estimates from line broadening), such crystallites being randomly mixed in no preferred order with the silica component present in its amorphous form. The X-ray diffraction pattern for the zirconia crystallites was found to be consistent with the ASTM X-ray diffraction data card 7–337 for cubic zirconia, though because of the small crystallite sizes present, and the consequent line breadth in the diffraction pattern, it was difficult to rule out the presence of tetragonal zirconia or a mixture of cubic and tetragonal zirconia. These refractory articles can be further characterized as articles which when fired at higher temperatures, as described in the next paragraph, contain tetragonal zirconia as the major crystalline component in the so-fired refractory.

Though the refractory articles resulting from the firing at 500° to 900°C. have useful physical properties and can be used as such, such properties, particularly tensile strength, elastic moduli, and density, can be enhanced by firing the shaped articles in air or other oxidizing atmosphere at higher temperatures a sufficient period of time such that essentially or substantially all of the zirconia component is present in its tetragonal form and positively identifiable as such by X-ray diffraction. This tetragonal form is surprisingly irreversible and maintained when the so-fired articles are cooled to ambient temperature. Generally, these high temperatures will be in the range of 900° to 1150°C., preferably 950 to 1050°C. These temperatures, of course, are well below melting or fusing temperatures. Longer firing at the low temperatures in these ranges generally will be equivalent to shorter firing at the higher temperatures in these ranges, so far as formation of zirconia crystallites in predominantly the tetragonal form is concerned. These higher temperatures can be approached from room temperature by gradually or incrementally raising furnace temperature, or the articles can be placed in their dried green form or their 500° to 900°C.-fired form directly in a furnace which has previously been heated to the desired temperature of 900° to 1,150°C. However, when green articles are directly fired at a particular temperature in this range, ignition may occur and cause opaque articles to form if the fired articles are too closely packed in the furnace. Variations in firing schedules will become apparent to those skilled in the art. Dried green articles can be heated to or at 500°–550°C. for a period sufficient to convert the article to a refractory and then can be placed directly in a 1,000°C.-furnace and heated for a period sufficient to form a refractory article with the desired mixture of tetragonal zirconia and amorphous silica, usually 30 minutes to 1 hour. Prolonged heating at 1,000°C., or slightly above this temperature, will not adversely affect the refractory, though if the final firing temperature is in the range of 1,050° to 1,150°C., it should be held at such temperatures for only a short time, e.g. 15 to 20 minutes or less, to avoid formation of substantial amounts of zircon. In order to obtain a uniform fired product, green articles to be fired should not be too closely packed as to cause carbon to be trapped and retained and should be placed in that portion of the furnace where temperature control is assured. Different substrates or saggers on which the products are disposed during firing may result in products having somewhat different appearances (e.g., translucent rather than transparent), though generally the same desired physical properties and microstructure will be obtained with any heat stable substrate. Here, again, in firing the products of these higher temperatures, they can be in the form as produced by the dehydrative gelling step or in a modified form, e.g., strands, spools, cylinder of fibers, hanks, tows, cloth, yarn, etc.

At about 900°C., a significant microstructural change occurs. X-ray diffraction analysis of 900° to 950°C.-fired fibers definitely established the presence of tetragonal zirconia with larger crystallite sizes. Electron microscopy with a resolution of about 10 Angstroms of 900° to 1,000°C.-fired dry thin films of the initial unconcentrated dispersion showed a consolidation or diffusion together of adjacent grains of the same species to form larger curvilinear areas homogeneously mixed together in a mottled array. Some of the areas changed from black to grey, or vice versa, due to diffraction of the crystalline grains (apparently $ZrO_2$) as the incident angle of the electron beam was changed, and other grains or areas maintained their tone (light grey to white) indicating a non-diffracting amorphous phase, apparently silica, this latter phase looking like a matrix in high silica refractories, e.g. $1ZrO_2:1SiO_2$.

The structural trnasformation is coincident with a significant increase in tensile strength and elastic moduli. Such tetragonal zirconia, and the coincident strength, flexibility, transparency, and clarity, are retained when the refractory products are cycled at temperatures up to 900° to 1,150°C., and thus will not mechanically fail due to phase transformation or thermal shock. When fired at 900° to 1,150°C. for the desired duration, X-ray diffraction reveals that these refractory materials have crystallites in the order of 400 to 1,000 Angstroms, based on estimates from line broadening, and that such crystallites are essentially or predominantly all tetragonal zirconia (the X-ray diffraction pattern found for this species of crystallite being consistent with ASTM Card 14-534) with a very minor amount, if any, of monoclinic zirconia present (the presence of this latter type of zirconia crystallite being confirmed by an X-ray diffraction pattern consistent with ASTM Card 13-1307), and no evidence of any cubic zirconia being present. Further, both X-ay diffraction and electron diffraction establish that the silica component is undetectable and apparently present in its amorphous state in admixture with the zirconia crystallites. Thus, these refractory products cannot be properly classified as polycrystalline, microcrystalline, or amorphous, but rather as a mixture of crystalline material (zirconia) and amorphous material (silica). (An amorphous material is generally accepted as meaning one which does not have any crystallites that are discernible under X-ray diffraction analysis.) Such refractory articles are likewise transparent and clear when viewed under an optical microscope. They can also be characterized as monolithic and zircon-free.

The refractory fibers of this invention fired at 900° to 1,150°C. will generally have densities in the range from 3.0 to 4.3 g/cc. (or as low as 1.5 g/cc if prepared from green articles which were initially autoclaved in an inert atmosphere to increase porosity), with diameters in the range of 10 to 40 $\mu$, tensile strengths (at break) in the range from 50,000 to 250,000 psi. and higher (e.g. to as much as 500,000 psi. in some instances), usually at least 100,000 psi. and typically 150,000 to 250,000 psi., and with elasticity moduli in the range of 7 to 20 $\times$ 10$^6$ psi., usually 10 to 18 $\times$ 10$^6$ psi., these various properties varying with the relative $ZrO_2$:$SiO_2$ mole ratio in the fibers, the presence of coloring additive, porosity, and the temperature and duration of firing. The refractory products also have high melting points, high purity, low thermal conductivity, and are generally resistant to common chemicals, e.g. acids. For example, 1,000°C.-fired fibers of 1$ZrO_2$:1$SiO_2$ having an average tensile strength of 182,000 psi., when soaked 34 days in concentrated hydrochloric acid were found to lose only about 7 percent of their strength and they were still flexible and appeared glossy, transparent, and water-clear.

If desired, these refractory articles can be heated for extended periods (e.g. 2 to 12 hours or more) at temperatures above 1,000°C., e.g. at temperatures of 1,050° to 1250°C. or higher, to convert the refractory material to one which contains zircon ($ZrSiO_4$), such refractory articles containing various amounts of zirconia (present usually in its tetragonal and monoclinic forms) and silica (present in its amorphous and cristobalite forms) in their uncombined forms. However, those refractory articles containing significant amounts of zircon have significantly reduced strength and flexibility, and as such are less preferred refractory materials. Depending on how high the further firing temperature is and its duration, the refractory may contain substantial amounts of zircon (i.e., with X-ray diffraction lines having a relative intensity of 100) and will be translucent or more often opaque, and will be brittle and fragile. The extremely high temperatures will even convert the refractory to one consisting essentially of just zircon if the $ZrO_2$ and $SiO_2$ components are present in equimolar amounts. (When zircon and cristobalite silica have been found, their X-ray diffraction patterns were found to be consistent with ASTM Cards 6-266 and 11-695, respectively.)

Figure 3:
FIG. 3 represents transparent fibers, photographed at 50X with transmitted light, obtained by firing at 1,000°C. fibers comprising $1ZrO_2:1SiO_2$.
Figure 4:
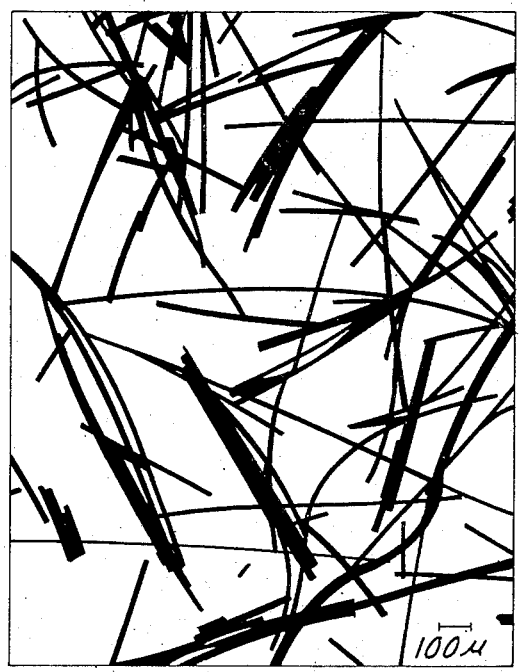
FIG. 4 represents opaque fibers, photographed at 50X with transmitted light, obtained by firing at 1,200° to 1300°C. fibers comprising $1ZrO_2:1SiO_2$.

The nature of the refractory articles of this invention and the results obtained by firing at elevated temperatures are illustrated in the accompanying drawing. FIG. 1 illustrates what the preferred fibers of this invention look like when examined under an optical microscope with transmitted light, these particular illustrated fibers being those prepared in Example 17 (Run 5) fired at 1,000°C for 1 hour, and composed of a mixture of $ZrO_2$ and $SiO_2$ in a mole ratio of 1:1 and containing 0.06 mole of ferric oxide to impart a gold color. These fibers are clear, transparent, essentially continuous in length and round in cross-section in appearance as well as strong and flexible, X-ray diffraction analysis revealing only $ZrO_2$ crystallites, the relative intensity of the diffraction lines attributable to tetragonal $ZrO_2$ being 100 and those attributed to monoclinic $ZrO_2$ being 10. Note especially in FIG. 1 the transparency of these fibers: where one fiber intersects and overlays that of another, the diffracted outline of the fiber below can be sharply seen through the top fiber, as indicated for example by reference number 1. When such fibers, however, are fired at 1,050° and 1075°C. for 1 hour (as described in Example 17, Runs 7 and 8), they become opaque black under transmitted light and rust red when similarly viewed with the unaided eye or with oblique light under a binocular microscope, and have the appearance depicted in FIG. 2. The fired fibers illustrated in FIG. 2 were weak and fragile and composed of a significant amount of zircon (with X-ray diffraction lines having a relative intensity of 70 to 80), as well as tetragonal and monoclinic $ZrO_2$. FIG. 3 depicts the appearance of fibers similar to those of FIG. 1, except that they were composed of 1$ZrO_2$:1$SIO_2$ (and no $Fe_2O_3$) and resulted from firing green fibers from room temperature to 1,000°C., as described in Example 10. When these fibers were refired to 1,200° to 1300°C. for 2 hours, they had the opaque black appearance under transmitted light (or opaque white under oblique or incident light) depicted in FIG. 4 and were brittle, breaking into the small lengths shown in that figure during handling in the course of mounting them for microscopic examination. The 1,000°C-fired fibers of FIGS. 1 and 3 when broken or fractured for analysis with a razor blade from a tow of such fibers and viewed with a scanning electron microscope at 300$\times$, showed the fibers to have a round or circular cross-section, some of the broken ends of the fibers having the appearance of a conchoidal fracture, such fractures being common to non-crystalline or amorphous structures.

In describing refractory products of this invention as "transparent", this term means that the particular article in question, when viewed under a microscope has the property of transmitting rays of light, so that bodies beneath the article, such as bodies of the same nature as the transparent article, can be clearly seen through the transparent article, the outline, periphery or edges of bodies beneath being sharply discernible. "Opaque" articles, on the other hand, are those which are impervious to light and bodies beneath are obscured by opaque article and cannot be seen therethrough. The "translucent" articles are those which fall between transparent and opaque, and though translucent articles have the property of transmitting light to some degree, and therefore are somewhat or partly transparent, bodies beneath can be seen in a diffuse manner rather than in a clearly distinguishable or sharp manner. Sometimes, because of vagaries in firing, an article or product may be a mixture of these various types of products, though generally one will be present in a predominant amount, indicative of the true nature of the mixture, the other products present in minor amounts having their particular appearance due to incomplete firing at the desired temperature or due to overheating because of hot spots in the furnace.

Articles of this invention are preferably those which are transparent though for some particular applications, for example where the product is used as a reinforcement for composites, transparency will not be important. The transparent quality of a refractory product of this invention is coincident with other desirable properties, such as strength and flexibility and the presence of zirconia, and thus transparency can be considered in a sense as a gross measure of the quality of the refractory product. In some applications of the refractory products of this invention, e.g. where a fiber or bundle of fibers are used in fiber optics or where microspheres are used in reflective sign surfaces, transparency will be of special importance.

Flexibility is another characterizing property of some of the refractory fibers of this invention. Flexible fibers in the form of monofilaments or in multifiber forms, e.g., threads, strands, yarns, rovings, tows, etc., are capable of being handled and fabricated, for example as flexible woven textiles or cloths, without breaking or other disintegration when bent or twisted, and in this application "flexibility" means that a plurality of fibers, e.g. 100, in the form of a tow or strand can be twisted to form a yarn or tied in the form of a "figure 8" knot without breaking. Such flexible fibers will generally have elastic moduli less than $20 \times 10^6$ psi., and usually in the range of 5 to $18 \times 10^6$ psi., moduli higher than $20 \times 25 \times 10^6$ psi. being relatively stiff. It isn't essential in this invention to make the fibers with fine diameters in order to obtain flexibility, since fibers having diameters as large as 30 $\mu$ have been prepared with excellent flexibiliy.

The refractory product of this invention is generally particularly useful where high temperature stability or refractoriness is desired or required, for example up to about 1,000° to 1,100°C. Above such temperatures, the refractory products of this invention generally will begin to lose strength, flexibility, and transparency, coincident with the formation and crystal growth of zircon and the appearance of monoclinic zirconia in X-ray diffraction analysis at room temperature. However, where such loss in properties are not important for the particular application of these refractory products, they can be employed in such applications since they will retain their solid state to temperatures as high as about 1,675°C. and higher, the refractory products of this invention having an equivalent mole ratio of $ZrO_2:SiO_2$ of 1:1 becoming completely molten only at about 2,400°C. The refractory products of this invention can be employed alone or per se in various applications in the form in which they are obtained as fired, or their physical form can be modified, e.g., comminuted or pulverized to form a powder, or in their form as prepared or as modified they can be mixed or coated with or bonded to other materials, e.g. composite matrix materials.

The refractory fibers of this invention are particularly useful in fabricating woven, felted, knitted, and other types of textiles such as braids. Such textiles generally will have the same properties, such as high strength, flexibility, refractoriness, and chemical resistance, as the fibers from which they are made. The internally colored refractory fibers will find particularly useful application in decorative fabrics, such as used in clothing, upholstery, wall covering, etc. Fibers or yarns of this invention of different colors and/or composition can be used together in making fabrics with decorative designs. Some of these fibers, such as those containing ferric oxide as an internal colorant or additive, are capable of being branded to form designs thereon of different color. Fibers or yarns of this invention can be plied or interwoven with fibers of other materials, such as metal fibers, silica fibers, carbon, graphite, Teflon polytetrafluoroethylene or fiberglass, if desired. Woven cloths made from the refractory fibers can be firmly bonded as wall covering to various substrates. For example, such cloths can be bonded with molten glass, or refractory cements such as zircon, aluminum oxide, phosphates, and silicates, to aluminum or other metal substrates and used as the interior walls of airplanes. The woven cloths (or mats) can also be used as layups in plastic, metal, or ceramic laminates.

The refractory fibers of this invention can be used in the form of fabrics, mats and batting as lightweight acoustical or thermal insulation for high temperature equipment, such as resistance and induction furnaces, and for purposes of heat shielding or reflecting, such as heating mantles and thermal curtains.

In their porous form, the refractory fibers are useful in filtering or adsorption applications, for example a filter to remove solids for hot gases, e.g. particulate matter from cigarette smoke, or as a chromatographic column packing to selectively separate or resolve liquids or gases, or as catalysts or catalyst supports.

Another particularly useful application for the refractory products of this invention is that of reinforcement for structural plastic, elastomeric, metallic, or ceramic composites, especially those composites used in high temperature environments or even hyperthermal environments found in the aerospace industry, and in ablative environments.

The refractory fibers can be used to form fiber-reinforced plastic composites and fiber-reinforced metal matrix composites. The matrix materials which can be so reinforced include any of those heretofore used in making such composites, such as those disclosed in the above-cited "Modern Composite Materials" text. The plastics may be either of the thermosetting or thermoplastic types. Representative plastics which can be used include epoxy resins, polyester resins, acetal resins, acrylics, especially methyl methacrylate polymers, amino resins, especially urea-formaldehyde, and melamine-formaldeyhde, alkyds, cellulosics, especially ethyl cellulose, cellulose acetate, and cellulose proprianate. fluorocarbons, furanes, polyurethanes, phenolics, polyamides, polycarbamates, vinyl aromatic such as styrene, polyolefins, especially polyethylene, and the like. The refractory fibers used as reinforcement for such plastics serve to strengthen shaped articles made from such plastics. The techniques which can be used in incorporating the refractory products of this invention as reinforcements in plastic matrices are well known, see "Handbook of Reinforced Plastics," by Oleesky and Mohr, Reinhold Pub. Corp., N. Y. (1964).

Metal matrix composites have had generally only limited application heretofore, one major reason being the lack of reinforcement materials which will withstand the elevated temperatures encountered in processing, e.g. casting and sintering temperatures. The refractory fibers of this invention, because of their thermal stability, strength, flexibility and other properties, are useful as reinforcements for metal composites, such as shaped or cast articles made of aluminum, copper, magnesium, nickel, titanium, etc. Here too the prior art methods of incorporating reinforcements in metal matrix composites can be used, reference being made to "Fiber-Strengthened Metallic Composites," ASTM Spc. Tech. Pub. No. 427, published by the American Society for Testing and Materials, Phil., Pa. (1967).

The refractory products of this invention can also be used as reinforcement for ceramic composites, such as silica, glass, aluminum silicate, and other inorganic materials, such reinforced ceramics being in the form of blocks, paper, and other shaped articles used in high temperature environments.

The refractory fibers of this invention can also be used as abrasion resistant and/or reinforcing agents for elastomeric materials, such as rubber, e.g. natural rubber, styrene-butadiene rubbers (SBR), acrylonitrile-butadiene rubber (NBR), and neoprene (WRT), for example where such rubbers are used in making passenger-car or truck tires.

The objects and advantages of this invention are further illustrated in the following examples, but it should be understood that the particular materials used in these examples, as well as amounts thereof, and the various conditions and other details described, should not be construed to unduly limit this invention. In these examples, the various Ludox, Nalco, Syton colloidal silica products recited and used are those identified and described hereinbefore. The aqueous zirconium diacetate solution recited in these examples is the commercially available product hereinbefore described, having an equivalent of 22 weight percent $ZrO_2$. The viscosities recited are Brookfield viscosities measured at ambient room temperature. Tensile strength data on fibers was obtained by vertically suspending a single fiber between two mounting blocks and adding weights of know value to the lower block until the fiber broke. The elastic moduli values reported are those obtained according to Method FMT–11 described in the U.S. Air Force's Tech. Rep. AFML-TR-67-159, Sept., 1967. Weight percent solids data was obtained by drying and firing in air to about 1,000°C. a sample of the dispersion. Where the nature of the various fired refractory products is described as being that observed with an optical or binocular microscope, the nature described is that observed under magnification with oblique light. The recited identification of crystallites by means of X-ray diffraction was verified by comparing the observed pattern with the particular ASTM card reporting such pattern, the code numbers for these various ASTM cards being recited hereinbefore. The X-ray data reported is that obtained at room temperature with a General Electric Co. X-ray diffraction instrument, XRD-3, at 40 kv, 20 ma, using a powder diffraction camera (Debye-Scherrer) with an effective film diameter of 14.32 cm. Unless otherwise indicated, the sample were powdered samples exposed 0.5 to 2 hours to copper, K $\alpha$ radiation wavelength 1.5405 Angstroms, filtered through a nickel filter. Where cubic zirconia is reported in various X-ray analyses, the presence of tetragonal zirconia should not be inferred as being necessarily absent, the line breadth in the diffraction pattern being such as to not positively exclude such species, as mentioned hereinbefore.

EXAMPLE 1

Eighty grams of an aqueous colloidal dispersion of silica (Nalco 1030) were added with mixing to 225 g. of an aqueous solution of zirconium diacetate to provide a colloidal dispersion of silica in aqueous zirconium diacetate having a pH of about 4, an equivalent $ZrO_2:SiO_2$ mol ratio of 1:1, and an equivalent solids content of about 48 wt. percent. The resulting aqueous dispersion was slightly cloudy on mixing but became clear when concentrated. Such concentration was achieved by placing the dispersion in a rotating flask partially immersed in a 30°–50°C. water bath and rotating the flask while maintaining the contents under a vacuum (ca. 29 inches Hg) with a water aspirator, this concentration step being continued until the resulting concentrate became viscous enough (about 50,000 to 70,000 cps) to enable fibers to be pulled therefrom with a glass rod. The viscous concentrate was then centrifuged for about 15 min. in a laboratory test tube centrifuge to remove bubbles. The resulting clear viscous concentrate was then extruded under a pressure of 130 psi into ambient air (ca. 22°C.) though a gold-platinum spinnerette having six round 3-mil orifices. The fibers or filaments so extruded were essentially continuous and straight and were drawn for about 3 ft. in the air and wound in a parallel fashion on a variable speed take-up drum covered with a sheet of polyester film, the speed of the drum being adjusted to exert a slight pull on the extruded fibers and hold them taut as they were extruded and wound, thereby effecting attenuation of the fibers. The green fibers so spun were essentially dry on their surface, they did not stick together after being wound, and were glossy, looking much like spun glass fiber, and under a binocular microscope appeared water clear, transparent, smooth, round in cross-section, and straight. As wound on the drum in the form of a coil or winding, the fibers appeared white and glossy.

The coil was removed from the drum and fired in air by placing the same in an electric furnace (Temco Model No. FL-630), raising the temperature from room temperature up to 550°C., and holding at 550°C. 2 hrs. Some of the 550°C.-fired fibers were further fired in air in said furnace for about 1 hr. at 775°C., and some of the 550°C.-fired fibers were further fired in air at 1,000°C. overnight (about 12 hrs.). Some of the resulting 775°C.-fired fibers were fired in air to 1,050°C. Some of the fibers fired to 1,050°C. were fired in air at 1,050°C. overnight. Some of the latter 1,050°C.-fired fibers were then fired in air for about 48 hrs. at 1,100°C. The 550°C.-fired fibers had diameters of about 10–17 $\mu$ with tensile strengths in the range of 75,000 to 150,000 psi. The 775°C.-fired fibers had diameters of about 15 $\mu$ with tensile strengths in the range of 95,000 to 155,000 psi. The fibers fired to 1,050°C. had diameters of about 15 $\mu$ and tensile strengths in the range of 90,000 to 160,000 psi. The 550°C.-, 775°C.-, and 1,000°C.-fired fibers and those fired to 1,050°C. all appeared transparent, glossy, smooth, round, and essentially continuous and straight under a binocular microscope. Those fibers which were held overnight at 1,050°C. had diameters of about 15 $\mu$ and tensile strengths of 60,000 to 75,000 and exhibited a sharp extinction when examined with a microscope using polarized light, and exhibited some small crystallites or seeds, probably zircon. (Tensile strength values given above are those obtained at the moment the fibers being tested broke under the applied load.) All fibers, except the 1,100°C.-fired, were flexible.

X-ray diffraction analyis of the 775°C.-fired fibers revealed the presence of exclusively $ZrO_2$ crystallites, in the cubic form, the $SiO_2$ component being undetected and being apparently present in the amorphous state. The 1,000°C.-fired fibers did not break in handling, i.e. they were strong, and X-ray diffraction analysis showed the presence of $ZrO_2$ predominantly in the tetragonal form (relative intensity 100) and to a small extent in the monoclinic form (relative intensity 25), the $SiO_2$ component again being apparently amorphous. The 1,100°C.-fired fibers were found under X-ray diffraction analysis to comprise a mixture of zircon (relative intensity 100), tetragonal $ZrO_2$ (relative intensity 80) and monoclinic $ZrO_2$ (relative intensity 40), the balance of the $SiO_2$ component, not combined in the form of zircon, again being apparently amorphous. When these 1,100°C.-fired fibers were examined under an optical microscope, they were found to be composed of opaque crystalline areas some of which were as wide as the diameter of the fibers (about 15 $\mu$) with lengths up to about 5 times the diameter (i.e. about 75 $\mu$), these opaque crystalline areas being separated by translucent milky areas. These 1,100°C.-fired fibers were very fragile and broke in handling.

The above results and evaluations of the various fired fibers show inter alia that the strongest transparent fibers were those obtained by firing to a temperature where substantial amounts of stable tetragonal $ZrO_2$ are formed, e.g. to 1,050°C., and that firing for extended periods at 1,050°C. and above (e.g. 1,100°C.) reduced their strength and caused them to become opaque, such fibers no longer having tetragonal $ZrO_2$ in a dominant amount but containing zircon crystallites and monoclinic $ZrO_2$ in substantial amounts.

EXAMPLE 2

A colloidal dispersion of silica in aqueous zirconium diacetate was prepared by adding 48 g. of colloidal silica (Nalco D-2139) to 112.5 g. of aqueous zirconium diacetate, the $ZrO_2:SiO_2$ mole ratio equivalent of the resulting dispersion being 1:1. The latter was concentrated using a procedure like that of Example 1 to produce a viscous concentrate having a viscosity of 120,000 cps. Green fibers were spun from this concentrate in a similar manner and fired in air from room temperature to 500°C. and held at 500°C for 1 hr., the resulting fibers being flexible, straight, continuous, and appearing water clear, transparent and round under a binocular microscope with diameters of 15–20 $\mu$. A portion of these 500°C.-fired fibers were refired in air at 1,000°C. for 1¼ hrs., the resulting fibers being the same in appearance as before, with a modulus of elasticity of over the range of 7 to 20 × $10^6$ psi., and an average of 12 × $10^6$ psi., and a density (determined by mercury porosimetry) of 3.86 g./cc.

EXAMPLE 3

A colloidal dispersion of silica in aqueous zirconium diacetate was prepared in a manner similar to that of Example 1 using 160 g. of an aqueous colloidal dispersion of silica (Ludox SM-15), which had been filtered first through a Whatman No. 54 filter paper and then through a 10 $\mu$ Millipore filter paper, and 225 g. of the aqueous zirconium diacetate solution, the equivalent $ZrO_2:SiO_2$ mol ratio of the resulting mixture being 1:1. The resulting dispersion or sol stayed clear as mixed and was concentrated in a Rotovapor flask under the vacuum of a water aspirator, the flask being rotated in a 30°–50°C. water bath for about 4 hrs., and then rotated overnight at ambient pressure and temperature. The resulting concentrate had a viscosity of about 52,000 cps. and was spun in a manner like that of Example 1, using a spinnerette pressure of 60 psi. and a drum speed sufficient to wind each fiber at 100 linear feet per minute. The resulting coil of green fibers were fired from room temperature to 500°C. and then held at 500°C. for 20 min. Another coil was similarly fired at 560°C. for 20 min. The fibers of both fired coils were continuous and straight and could be twisted to form a yarn without breaking, and under a binocular microscope appeared water-clear, transparent, glossy, smooth and round. Both of the coils were then further fired at 1,000°C. for 1 hr., yielding strong, flexible fibers having a tensile strength at break of 250,000 psi and the same appearance as those of the 500°C.- and 560°C.-fired fibers.

EXAMPLE 4

Viscous concentrate like that of Example 3, with an equivalent $ZrO_2:SiO_2$ mole ratio of 1:1, was similarly spun at 80 psi., using a drum speed sufficient to wind each fiber at a rate of 110 linear feet per minute. Portions of the resulting green fibers were fired at different temperatures, and the densities, tensile strengths (at break) and modulus of elasticity values of the fired fibers were determined. (Under a binocular microscope, the fired fibers all had the same appearance as the 1,000°C.-fired fiber of Example 3.) The firing conditions and the results of these examinations are summarized below:

Table I

| Run | Firing | Density, g/cc | Tensile strength, psi | Modulus of elasticity, psi, × $10^6$ |
|---|---|---|---|---|
| 1 | from RT to 500°C., and 1.5 hr. at 500°C. | 3.0 | 25,000–35,000 | 7.4 – 9.5 |
| 2 | 500°C.—fired fibers further fired for 1.5 hr. at 750°C. | 3.45 | 74,000–96,000 | 11.5 – 17.3 |
| 3 | 500°C.—fired fibers further fired for 1.3 hr. at 1,000°C. | 3.74 | 130,000–145,000 | 13.5 – 18.3 |

These results show the greater strength and modulus of elasticity obtained by firing at 1,000°C., coincident with the detection of tetragonal $ZrO_2$, as compared to firing at the lower temperatures of 500°C. and 750°C.

EXAMPLE 5

Fibers spun in a manner like that of Example 3 from the same concentrate (with equivalent $ZrO_2:SiO_2$ mole ratio of 1:1) were fired in air at various temperatures. All of the fired fibers were flexible, continuous and straight, and under a binocular microscope they were water-clear, transparent, round and smooth. The densities, tensile strengths (at break), and modulus of elasticity values of the fired fibers were determined as well as their X-ray pattern. Results are summarized in Table II.

Table II

| Run | Firing | Density g/cc | Diameter, μ | Tensile strength psi | Modulus of elasticity psi × 10⁶ | Apparent order of crystal size, by X-ray exam., Å | X-ray diffraction $ZrO_2$ phase, relative intensity*** | | |
| --- | --- | --- | --- | --- | --- | --- | --- | --- | --- |
| | | | | | | | Cubic | Tetra | Mono |
| 1 | 500°C. for 1 hr. | 3.30 | 19-20 | 37,000-59,000 | 6-10 | 200 - 400 | 100 | – | – |
| 2 | 600°C. for 1 hr. | 3.49 | 18-20 | 45,000-48,400 | 7-12 | 200 - 400 | 100 | – | – |
| 3 | 700°C. for 1 hr. | 3.49 | 15-30 | 43,475-55,00 | 9-11 | 200 - 400 | 100 | – | – |
| 4 | 800°C. for 1 hr. | 3.60 | 17-19 | 58,000-150,000 | 9-11 | 200 - 400 | 100 | – | – |
| 5 | 900°C. for 1 hr. | 3.57 | 18-20 | 62,000-146,000 | 12-17 | 400 - 800 | 100** | – | – |
| 6 | 1000°C. for 4 hrs. | 3.65 | 15-18 | 118,000-175,000* | 13-16 | 600 - 1000 | – | 100 | <1 |
| 7 | 1000°C. for 4 hrs. | 3.85 | 15-20 | 59,000-216,000 | 10-17 | >800 | – | 100 | <<1 |
| 8 | 1000°C. for 19 hrs. | 3.93 | 18-30 | 102,000-160,000 | 13-20 | >800 | – | 100 | 8 |
| 9 | 1100°C. for 1 hr. | 3.79 | 15-20 | 115,000-175,000 | 15-17 | 800 | – | 100 | 6 |

*Fiber sample slipped out of mount during test at 170,000 psi; it was evidently stronger than this value.
**X-ray diffraction of the 900°C.-fired fibers indicated that the $ZrO_2$ crystallites in this run were either cubic or tetragonal; it was difficult to distinguish which phase was present.
***X-ray diffraction analysis on each sample indicated no preferred orientation of the $ZrO_2$ crystallites when a single fiber from each run was examined.

The above results and data of Table II show again the association of high strength and modulus with the presence of tetragonal $ZrO_2$, and the retention of transparency at elevated firing temperatures where such tetragonal $ZrO_2$ is present. The moduli of elasticity and densities set forth in Table II are all lower than that reported for zircon.

EXAMPLE 6

A dispersion of colloidal silica in aqueous zirconium diacetate was prepared by adding 900 g. of colloidal silica (Ludox AM) to 2,525 g. of aqueous zirconium diacetate. The resulting mixture (equivalent $ZrO_2:SiO_2$ mole ratio of 1:1) was heated in a 60°-75°C. water bath in a flask under water aspirator vacuum for about 14 hrs., then concentrated for about 6 hrs. in a Rotovapor flask revolving in a 40°C. water bath under water aspirator vacuum, and then centrifuged for 15-20 min. The resulting concentrate (about 1 liter, 60,000 cps. was pressurized at 50 psi from a bottle to a metering pump and pumped at 200 psi through two 400 mesh stainless steel screens and extruded through a spinnerette having 30 4-mil round orifices. The fibers as continuously extruded from the spinnerette were water clear, transparent and round under a binocular microscope, and they were individually drawn downwardly for 6 ft. in air (80°F. 26% R.H.) and passed upwardly around a paper wick wet with 2-ethyl-1-hexanol lubricant through an eyelet thread guide. The resulting sized strand (consisting of 30 fibers) was passed under one revolving roll and then over an adjacent, oppositely revolving roll, and the strand allowed to fall freely 3 ft. to collect or piddle on a continuously moving belt of aluminum stock (4 mil × 18 in.) moving at the rate of 1 ft./min. The loaded aluminum belt passed under a 9 ft. long bank of heat lamps and into a 6 ft. Globar electric furnace set at a temperature of 1,050°F. and having a residence time of about 6 min. The strand on the moving belt turned brown in the first couple of inches of the furnace, then turned black and was essentially white in appearance at about the middle of the furnace where the temperature gradient peaked at 1,050°F. The fibers as fired were continuous and straight and when examined under a binocular microscope had a uniform diameter of about 15 μ and were round, smooth, water-clear, and transparent, and they were much stronger than the green fibers. They were very flexible.

EXAMPLE 7

A viscous concentrate prepared like that of Example 6, having an equivalent $ZrO_2:SiO_2$ mole ratio of 1:1 and a viscosity of 46,000 cps., was similarly spun into fibers, except that it was pressurized from a bottle under 90 psi to a pump and pumped at 230 psi to a spinnerette fitted with one 400-mesh screen and having 30 4-mil round orifices. The spun fibers were lubricated with FC-43 fluorocarbon and drawn in the same way with the rolls revolving at a rate sufficient to draw the fibers at 200 ft./min., the aluminum belt moving into the 1,050°F. furnace without the preliminary heating with the heat lamps. The fired strands were wound on paper cores using a tasland winder. The fibers in the strands after emerging from the furnace were continuous, flexible, and straight, looking much like spun fiber glass, and under a binocular microscope appeared water-clear, transparent, round, smooth, and glossy. The fibers as fired had a uniform diameter of about 15 μ.

EXAMPLE 8

A viscous concentrate (140,000 cps., equivalent $ZrO_2$:$SiO_2$ of 1:1) was prepared like that of Example 6 and fibers were spun and fired in a manner like Example 7. They were spun by pumping the concentrate at 500 to 1,000 psi through a 22 $\mu$ powder metallurgy stainless steel filter and extruding through a spinnerette having 80 3-mil round orifices and drawing the extruded fibers in air (78°F., 24% RH) at the rate of 250 ft./min.

The green strands were fired in air at 1,050°F. for 6 min. like that in Example 6. A portion (26 g.) of the fired strands were randomly packed in a 4.2 in. I.D. Vycor glass tube and fired in air at 950°C. for 1 hr., 15 min. to consolidate or set the strands in the form of a mat or batt. The resulting fired mat (4.2 in. dia. and 1.5 in. thick with a bulk density of 0.08 g/cc.) was then tested to determine its sound suppression property according to ASTM C–384–68. The mat was found to have a peak sound absorption coefficient of 0.95 at 1,600 cycles/sec., showing that the refractory mat had excellent sound suppression properties at high frequencies comparable to that of spun glass fiber. The fibers in the fired mat were very flexible and under a binocular microscope appeared water-clear, transparent and round.

Another portion of the 1,050°F.-fired strands were refired in air at 1,000°C. for 1 hr., the individual fibers in the resulting refired strands being water-clear, transparent, and round under a binocular microscope. Chemical analysis of these refired strands revealed them to be composed of 70.4 wt. % $ZrO_2$ and 30.1 wt. % $SiO_2$, which is equivalent to a $ZrO_2$:$SiO_2$ mole ratio of 1.14:1.

EXAMPLE 9

A viscous concentrate (47,000 cps., equivalent $ZrO_2$:$SiO_2$ of 1:1) was prepared like that of Example 6 and fibers were spun in a manner like Example 7 (except that they were not coated with lubricant nor drawn in the form of a thread) by extruding the concentrate under a pressure of 190 psi through a spinnerette having 80 3-mil round orifices and drawing the fibers in air (82°F., 20 percent RH), on a take-up drum at a speed of 250–300 ft./min. A portion of the green fibers in the form of a coil was placed on a porous silica slab and fired in air from room temperature to 960°C. and held at 960°C. for 1 hour. The fired fibers were flexible and strong, with a modulus of elasticity of 15 $\times 10^6$ psi and a density (determined by mercury porosimetry) of 3.70 g./cc. Under a binocular microscope, they appeared water-clear, transparent, round, and shiny. Another portion of the green fibers were fired in air from room temperature to 1,100°F. and held at 1,100°F. for ½ hr., and a portion of the resulting fibers were refired in air at 1,800°F. for 1 hrs. and another portion refired in air at 2,200°F. for 2 hrs. The 1,800°F.-fired fibers, under a binocular microscope, were water-clear, transparent, and round, and X-ray diffraction showed the presence of only $ZrO_2$ in the tetragonal form (relative intensity 100) and in the monoclinic form (relative intensity 5), the $SiO_2$ component being undetected and apparently present in its amorphous form. The 2,200°F.-fired fibers, under a binocular microscope were opaque white, and they were fragile and sintered together at their intersecting points of contact. Under X-ray diffraction, they were shown to be composed of a mixture of zircon (relative intensity 100), tetragonal $ZrO_2$ (relative intensity 7), and monoclinic $ZrO_2$ (relative intensity 3), the balance of the $SiO_2$ not combined in the form of zircon apparently being present in the amorphous state.

The 960°C.-fired fibers were evaluated as reinforcement for a plastic composite as follows. A methyl Cellosolve solution of a thermosetting epoxy novolac resin was poured over a portion of the fibers to impregnate the same and the mixture heated in an oven to remove the Cellosolve solvent. The resulting tacky sheet was cut into an 0.6 $\times$ 6 in. strip and placed in a matched die mold at room temperature and hot pressed at 200–400 psi for 1 hr. at 350°F. The molded composite was then removed from the mold and post-cured in a 350°F. oven for 4 hrs. The cured composite had a Barcol hardness of 76–80, and was then tested to ASTM D790–66, using a 30/1 span/depth ratio, and found to have an unidirectional flexural strength at room temperature of 81.0 $\times 10^3$ psi and a modulus of 8.40 $\times 10^6$ psi, showing that the fibers were useful as a plastic composite reinforcement.

EXAMPLE 10

A dispersion of colloidal silica in aqueous zirconium diacetate was made by mixing 800 g. of colloidal silica (Ludox LS—30) with 2,244 g. of aqueous zirconium diacetate. This dispersion having an equivalent zirconia-to-silica mole ratio of 1:1 was concentrated under water aspirator vacuum in a rotating flask in a water bath and then centrifuged, the resulting concentrate having a viscosity of 740,000 cps. and an equivalent solids content of about 49 wt. percent. Fibers were spun from this concentrate from a spinnerette having 20 4-mil round orifices using a spinnerette pressure of 550 psi., each of the extruded fibers being drawn 4.5 ft. in air (75°F., 40% RH) by a take-up drum at a rate of 400 ft./min.

A portion of the green spun fibers were subjected to thermal gravimetric analysis (TGA) by heating them in air and measuring the weight lost as the temperature was increased. In one run, the temperature was increased at the rate of 10°C./min., and in two other runs at the rate of 40°C./min. In all three runs, the weight loss plotted against temperature increase produced a smooth curve, with the weight loss rate being greatest at about 360°–400°C. Weight loss was essentially complete at about 560°C. in all three runs, the total weight loss being 30–34 wt. percent based on the weight of the initial or green samples, about 99 percent of this total weight loss occurring by the time the temperature reached 500°C. Another portion of the green spun fibers were subjected to differential thermal analysis (DTA) by heating the sample (powdered at about 100 mesh) in air at a rate of 10°C./min. As the sample was heated, a small exotherm (probably due to dehydration) peaked at about 60°–70° C. and was complete at about 98°C. Another small exotherm occurred at 330°C. and a major exotherm (obviously removal of organic material) occurred sharply at 382°C., with a rapid fall off in this exotherm thereafter except for a small exotherm occurring at about 419°C. No further exotherm changes were noted as the temperature was increased to 1,000°C.

A portion of green fibers were fired in air from room temperature to 1,000°C. and cooled overnight, the fired fibers being continuous, straight, flexible and strong and under a binocular microscope appeared transparent, clear, round, and about 14–20 $\mu$ in diameter. FIG. 3 depicts the appearance of these fired fibers under a microscope. A portion of the 1,000°C.-fired fibers were refired in air at 1,200°–1,300°C. over a 2-hr. period, the resulting fibers being opaque and brittle, and under a microscope having the appearance depicted by FIG. 4.

A hank of the 1,000°C.-fired fibers was dipped in a sizing solution of 4 g. of L–1286 fluorocarbon in 200 g. of trichloroethylene and dried. Strands of the sized hank were coated with a sizing mixture of 1 part Kraton 101 butadiene-styrene rubber, 1 part Nujol mineral oil, and 18 parts toluol (these parts being parts by weight). The sized strands were then woven by hand to form a 1 × 8 in. piece of fabric. The fabric was placed in a 950°C. furnace and heated in air to 1,000°C. over about a 30-min. period and held at that temperature for 30 min. The fired fabric was cooled and found to be glossy, flexible, and strong, and under an optical microscope the fibers in the fabric appeared water-clear and transparent.

A piece of the fired fabric, which was about 2.5 inches in length, was tested to a load of 42 lbs. in tension on an Instron testing machine with a load applied by movement of 0.05 inch per min.; though the tested fabric was apparently permanently stretched, it did not break.

EXAMPLE 11

A viscous concentrate having a viscosity of 750,000 cps., an equivalent $ZrO_2:SiO_2$ mole ratio of 1:1 and 49 wt. percent equivalent solids, was prepared like in Example 10. This concentrate was spun in a like manner from a spinnerette having 20 3-mil round orifices using a spinnerette pressure of 850 psi., the extruded fibers being drawn in air (80°F., 50 percent RH) by a take-up drum at a rate of 430 ft./min. Two hanks of the fibers (measuring about 24 inches in length) were fired in air from room temperature to 980°C. (over a period of 4–6 hrs.) and held at this temperature for 1 hr. and then cooled overnight with the furnace shut off. The fired hanks were sprayed with IMS silicon spray and bunches of sprayed hanks were coated with the rubber-oil size used in Example 10. The sized fibers were then woven to form a piece of fabric which was fired in air at 800°C. to burn off the organic size used to assist in the weaving.

EXAMPLE 12

A viscous concentrate having a viscosity of 180,000 cps. and an equivalent $ZrO_2:SiO_2$ mole ratio of 1:1 was prepared like that of Example 10 and similarly spun into fibers. These fibers were fired in air from room temperature to 500°C. and refired at 1,000°C. for 1 hr. The fired fibers were cut into 12 inch long hanks and bunches of fibers from these hanks were twisted into yarn and a 3 × 4 inch piece of fabric woven therefrom. The borders of the fabric were coated with rubber-oil size used in Example 10. The fabric was heated in air at 1,000°C. for ½ hr. The fired fabric was white, glossy, and very flexible, the individual fibers, appearing transparent under a binocular microscope.

EXAMPLE 13

A number of different concentrates were prepared by concentrating various dispersions of colloidal silica in aqueous zirconium diacetate and the concentrates were spun to form fibers, using a spinnerette with six 3-mil round orifices, the spun fibers being drawn in air and wound on a reel. The composition of the concentrates and the spinning conditions are set forth in Table III. In all cases, the green (unfired) fibers were water-clear, transparent and round under a binocular microscope, and continuous and flexible.

The fibers were fired in air on a porous silica slab according to various schedules, I, II, etc., each schedule having from 2 to 4 incremental steps, and the nature and appearance of the fired fibers at the end of each schedule, and in some instances at the end of each step in a particular schedule, were noted, the firing schedules and the results obtained being set forth in Table IV. In Table IV, the nature of the predominant or major amount of fibers is given first, followed in parentheses by the nature of the minor amount of other fibers, if any. In all cases, the nature or appearance recorded was that observed under a 60 power binocular microscope with oblique lighting. Except where a notation was made that the fired fibers were fragile, sintered at points of contact, or grainy, the fired fibers were flexible in nature and essentially continuous. Some of the fired fibers were examined by X-ray diffraction, and the results of such analyses are set forth in Table V.

TABLE III

| | Composition of concentrate | | | | Spinning conditions | | |
|---|---|---|---|---|---|---|---|
| Run | Equiv. $ZrO_2:SiO_2$ | Vis., cps. ×10³ | Equiv. solids, wt. % | pH | Pres., psi | Takeup drum speed, ft/min. | Comment on spinning |
| 1 | 2:1 | 54 | 44.6 | 4 | 125 | 85 | spun well |
| 2 | 1.5:1 | 56 | 47.5 | 3.5 | 120–125 | 70–80 | spun well |
| 3ᵃ | 1:1 | 27 | ca45 | 3.5 | 100 | 110 | spun well |
| 4ᵃ,ᵇ | 1:1 | 43 | 47.5 | 3–3.5 | 125 | 50 | spun fairly wellᶜ |
| 5ᵃ,ᵈ | 1:1 | 38 | 46 | 3–3.5 | ca120 | ca120 | spun well |
| 6ᵃ | 1:1 | 16 | — | 3.5 | 125 | 180 | spun well |
| 7 | 1:1.5 | 104 | 50 | 3.5 | 125 | 125 | spun well |
| 8 | 1:2 | 82 | 49.5 | 3.5–4 | 125 | 165 | spun very well |
| 9 | 1:3 | ca100ᵉ | 51.5 | 3.5–4 | ca125 | ca60 | spun fairly wellᶠ | a — Colloidal silica used in preparing concentrate in these runs was Syton 200; all other runs used Ludox AM.
b — Concentrate for Run 4 was prepared from 240 ml. zirconium diacetate, 429 ml. Syton 200, and 16.2 ml. acetate acid.
c — Concentrate of Run 4 spun fairly well but the green fibers were not very strong and they broke into long lengths after being wound. When this concentrate was diluted with water to 15,000 cps. and spun at 75 psi, it spun better.
d — Concentrate for Run 5 was prepared from 120 ml. zirconium diacetate. 42 ml. Syton 200, and 1.6 ml. acetic acid, and resulting dispersion filtered.
e,f — Initial concentrate for Run 9 had too low a viscosity (78,000 cps) to spin well with the equipment used, so it was concentrated further (to about 100,000 cps.) and though it then spun fairly well, the green fibers were not strong and they broke into lengths ⅛ to 1 inch.
g — Concentrate initially prepared from 240 ml. zirconium diacetate, 86 ml. Ludox AM, and 3.2 ml. acetic acid (HAc) was too viscous (240,000 cps.) to spin with the equipment used, so it was diluted for Run 3 with water to 27,000 cps.

TABLE IV

| Run | Equiv $ZrO_2$: $SiO_2$ mole ratio | I A. 140°F., 2 hrs.[a], 340°F., 2 hrs.[a] then RT to 1100°F. and held 4 hrs. | I B. refired IA at 1800°F., for 2 hrs. | II refired IA at 2000°F. for 2 hrs. | III A. RT to 1100°F. and held ½ hr. | III B. refired IIIA at 1800°F. for 1 hr. | IV refired IIIA at 2000°F. for 2 hrs. |
|---|---|---|---|---|---|---|---|
| 1 | 2:1 | opaque blk. (water clear and transparent) | translucent to opaque white (clear, black), grainy | opaque white, grainy | opaque blk. (translucent amber) | about equal amounts of opaque blk & white grainy | opaque white, grainy |
| 2 | 1.5:1 | water clear & transparent (opaque blk.) | about equal amounts of opaque blk. & white, grainy | opaque white, translucent | opaque blk. (amber, clear & transparent) | about equal amounts of opaque blk. & white, grainy[e] | opaque white, grainy |
| 3 | 1:1 | water clear & transparent | transparent & slightly milky | transparent milky to translucent | water clear & transparent | opaque white | opaque white, grainy |
| 4 | 1:1 | water clear & transparent | transparent & slightly milky[c] | opaque white (milky transparent) | clear tan & transparent | opaque white (milky transparent)[e] | opaque white, grainy |

TABLE IV

| Run | V refired IIIA at 2200°F. for 2 hrs. | VI A. RT to 1100°F. and held 1 hr. | VI B. refired VIA at 1800°F., 1 hr. | VII RT to 1100°F. and held 1 hr then 2200°F., 1 hr. | VIII A. RT to 500°C. and held 1 hr. | VIII B. refired VIIIA from 500°C. to 950°C & held 1 hr. | IX RT to 500°C. and held 1 hr. then 1000°C. 1 hr. |
|---|---|---|---|---|---|---|---|
| 1 | opaque white, fragile, sintered[g] | — | — | — | — | — | opaque blk (opaque white), grainy |
| 2 | opaque white, grainy, fragile, sintered[c] | — | — | — | opaque blk. | water clear, & transparent, to milky to opaque blk. | opaque blk. (opaque white) |
| 3 | opaque white, grainy & fragile | — | — | — | water clear & transparent (opaque blk.) | water clear & transparent | transparent, milky to translucent |
| 4 | opaque white, grainy & fragile, sintered[c] | — | — | — | — | — | translucent, milky to opaque white |
| 5 | opaque white, grainy & fragile, sintered | — | — | — | — | — | transparent milky to translucent |
| 6 | opaque white, grainy & fragile, sintered | — | — | — | — | — | transparent & slightly milky |
| 7 | — | water clear & transparent | water clear & transparent | opaque white, grainy, fragile, sintered | water clear & transparent | water clear & transparent | water clear & transparent |
| 8 | — | water clear & transparent | water clear & transparent[c] | opaque white, grainy, fragile, sintered | water clear & transparent | water clear & transparent | water clear & transparent[f] |
| 9 | — | water clear & transparent | water clear & transparent | opaque white grainy, fragile sintered | — | — | water clear & transparent | a—The fibers were also examined after the 140°F. and 340°F. firing steps, but they exhibited no change in appearance from that of the green fibers, i.e. they were water clear and transparent.
b—"RT" means room temperature (about 72°F.)
c—These fired fibers had a modulus of elasticity of 8 × 10⁶ psi. In a duplicate of Run 4, fibers were fired in air in a vitreous silica tube from RT to 1100°F. for 4 hrs. and refired at 1800°F. for 2.5 hrs. were predominantly water clear and transparent, with a minor amount being translucent to opaque black and white.
d—In a duplicate of Run 6, fibers fired in a vitreous silica tube like the duplicate noted in footnote c were water clear and transparent.
e—See Table V for X-ray diffraction analyses of these fired fibers.
f—Fibers were fired in a duplicate Run 8 using the same Schedule IX, except that the 1000°C. step was held for 1.5 hrs., and were found to have a modulus of elasticity of 9.1 × 10⁶ psi.
g—"Sintered" in Table IV means sintered at point of contact.

TABLE V

X-ray diffraction analysis

Relative intensity of diffraction lines

| | | | $ZrO_2$ | | | |
|---|---|---|---|---|---|---|
| Run | Firing schedule | Crystallite size Å | Cubic | Tetragonal | Monoclinic | Other crystallites |
| 2 | IIIB | ca 10³ | — | 100 | 3 | none |
| 2 | V | 10³ | — | — | 30 | $ZrSiO_4$ (100) |
| 4 | IIIB | <10³ | — | 100 | 5 | none |
| 4 | V | >10³ | — | 2 | 7 | $ZrSiO_4$ (100) |
| 8 | VIB | <10³ | — | 100 | — | none |
| 8 | VII | >10³ | — | 100 | 70 | cristobalite $SiO_2$ (70), $ZrSiO_4$ (30) |

EXAMPLE 14

A dispersion of colloidal silica in aqueous zirconium diacetate was made by mixing 81 g. of colloidal silica (Ludox SM—15), which had been filtered through a 10 $\mu$ Millipore filter, and 227 g. of aqueous zirconium diacetate. The resulting mixture was concentrated in a Rotovapor flask to about 50,000 to 60,000 cps. The viscous concentrate (equivalent $ZrO_2:SiO_2$ of 2:1) was extruded under about 70 to 90 psi through a spinnerette having six 3-mil round orifices and drawn in air by a takeup drum. A coil of the green fibers were fired in air from room temperature to 500°C. and held at 500°C. for 1 hr. The resulting fired fibers were flexible, continuous, shiny, round, and predominantly black, with a minor amount being water clear and transparent, when viewed under a binocular microscope. When refired in air at 800°C. for 2 hrs., more of the fibers were clear, the fibers otherwise being the same as the 500°C.-fired fibers. When these 800°C.-fired fibers were refired in air at 1,000°C. for 1¼ hr., most of the fibers were water clear and transparent under a binocular microscope, with occasional black fibers being present, and in appearance were otherwise the same as the 500°C.- and 800°C.-fired fibers. The 1,000°C.-fired fibers were found to have a density (as determined by mercury porosimetry) of 4.33 g/cc, an average modulus of elasticity of about $8 \times 10^6$ psi, and, when examined by X-ray diffraction, were found to have crystallites that were predominantly tetragonal $ZrO_2$ (relative intensity 100) and to a minor extent monoclinic $ZrO_2$ (relative intensity 3), the $SiO_2$ component not being detected and apparently in its amorphous state; however, they weren't as strong as $1ZrO_2:1SiO_2$ fibers.

EXAMPLE 15

Thirty g. of powdered polyvinylpyrrolidone were dissolved in 130 g. water and the aqueous solution then stirred into 66 g. of an aqueous colloidal silica (Ludox AM), the resulting solution having a pH of 7. Hydrated zirconium sulfate (31 wt. percent $ZrO_2$ equivalent) was dissolved in the amount of 132 g. in 200 g. water, the resulting aqueous zirconium sulfate having a pH of about 1. The dispersion of silica in aqueous polyvinylpyrrolidone was stirred into the aqueous zirconium sulfate, the resulting mixture having a pH of about 1. This mixture was then concentrated in a Rotovapor flask to obtain a viscous concentrate having a viscosity of about 500,000 cps. This concentrate, containing an equivalent $ZrO_2:SiO_2$ mole ratio of 1:1 and an equivalent solids content of about 27 wt. percent was then spun into fibers, using a spinnerette with six 3-mil round orifices and operating at a pressure of 125 psi, the spun fibers being drawn in air and wound on a drum having a speed of about 100 ft./min. The spun fibers were heated in air from room temperature to 500°C. and held at 500°C. for 1 hr., and then refired in air at 1,000°C. for 1 hr. The resulting fired fibers when viewed under a binocular microscope had a diameter of about 7$\mu$ and were water clear and transparent, and were essentially continuous, flexible, and strong.

EXAMPLE 16

An aqueous dispersion of colloidal silica in aqueous zirconium diacetate was made by adding with mixing 198.3 g. of colloidal silica (Ludox LS) to 560.1 g. of aqueous zirconium diacetate, then adding 45.2 cc. of a saturated solution of ferric nitrate (containing 9.6 g. of equivalent $Fe_2O_3$), the resulting mixture being equivalent to 95 wt. percent of a mixture of $ZrO_2$ and $SiO_2$ in a mole ratio of 1:1 and 5 wt. % $Fe_2O_3$. The resulting mixture was concentrated in a Rotovapor flask, half-submerged and rotated in a 30°–40°C. water bath. A portion of the resulting concentrate (about 40,000–50,000 cps.) was spun into continuous, straight fibers with a spinnerette having six 3-mil round orifices using a spinnerette pressure of about 85 psi., the extruded fibers being heated with two infrared lamps, and drawn about 3 ft. in air by a takeup drum at 120 ft./min. These green spun fibers were flexible and under a binocular microscope, were clear, transparent, light yellow in color, and round. Portions of the green spun fibers were fired in air at different temperatures and the appearance and nature of the fired fibers determined. Results are summarized in Table VI.

Table VI

| Run | Firing | Strength, flexibility, and appearance of fired fibers under microscope |
|---|---|---|
| 1 | 500°C. for ½ hr. | strong, flexible, light gold, clear, transparent |
| 2 | 500°C. for ½ hr., then to 600°C. | strong, flexible, light gold, clear, transparent |
| 3 | 500°C. for ½ hr., then to 900°C. | strong, flexible, slightly darker gold, clear transparent |
| 4 | 500°C. for 1 hr., then to 1000°C. and held 1 hr. | strong flexible, orange red, transparent |
| 5 | 500°C. for 1 hr., then to 1100°C. and held 1 hr. | weak, brown-red, opaque |

EXAMPLE 17

A viscous concentrate having an equivalent $ZrO_2:SiO_2$ mole ratio of 1:1 and containing the same amount of $Fe(NO_3)_2$, and with a viscosity of 280,000 cps was prepared like that of Example 16. Fibers were spun from a spinnerette having twenty 4-mil round orifices, using a spinnerette pressure of 350 psi. and drum speed of 300 ft./min. The spun fibers were straight, flexible and essentially continuous in length. These fibers, under a binocular microscope were light yellow-gold in color, clear, and transparent. Hanks of about 2 ft. in length were fired in air from room temperature to 800°C., and allowed to cool with the furnace overnight, the fired fibers being gold in color, shiny, flexible, and strong, their length having shrunk to about 17.5 in. Under a binocular microscope, they were gold in color, clear, transparent, and round with diameters of about 15 $\mu$. Some of these 800°C.-fired fibers were refired in air at 950°C. for ¾ hr., and the refired fibers were orange-red in color, flexible and stronger than those fired to 800°C., and under a binocular microscope still appeared clear and transparent.

Another portion of the 800°C.-fired fibers were refired in hydrogen from room temperature to 800°C., and cooled in hydrogen, to produce shiny black fibers which were opaque but still strong and flexible, and which were attracted to a magnet but not electrically conductive.

Other portions of the above concentrate were not drawn but rather were extruded and allowed to fall from the spinnerette by their own weight and collect on a substrate in a random fashion. These extruded fibers (about 25–35 $\mu$ in diameter) were heated in air to 800°C. Portions of the 800°C.-fired C.-fibers were refired at higher temperatures for 1 hr. and their relative strength and microscopic appearance and their crystallite identity under X-ray diffraction was determined, as noted in Table VII.

16, using a Rotovapor flask and rotating it in a 40°–70°C. water bath under water aspirator vacuum, and centrifuging the concentrate. The concentrate (260,000 cps. equivalent 48.7 wt. percent solids and $ZrO_2:SiO_2$ of 1:1) was spun into continuous fibers from a spinnerette having 20 3-mil round orifices and under 450 psi pressure. The fibers issuing from the spinnerette were drawn through a 3 ft. × 4 in. aluminum pipe Table VII

| Run | Firing,°C. | Strength, flexibility, and appearance | X-ray diffraction*** rel., intensity |
|---|---|---|---|
| 1 | 850 | strong, flexible, gold, clear, transparent | cubic $ZrO_2$ (100) |
| 2 | 900 | strong, flexible, gold, clear, transparent | cubic $ZrO_2$ (100) |
| 3 | 950 | strong, flexible, slightly darker gold, clear, transparent | tetra. $ZrO_2$ (100) + mono $ZrO_2$ (1) |
| 4 | 975 | strong, flexible, slightly darker gold than Run 3, clear, transparent | tetra. $ZrO_2$ (100) + mono $ZrO_2$ (4) |
| 5* | 1000 | strong, flexible, orange-red, clear, transparent | tetra. $ZrO_2$ (100) + mono $ZrO_2$ (10) |
| 6 | 1025 | strong, flexible, copper-red, clear transparent to (some translucent) | tetra $ZrO_2$ (100) + mono $ZrO_2$ (15) |
| 7** | 1050 | weak, rust red, translucent to opaque | tetra $ZrO_2$ (100) mono $ZrO_2$ (60) + $ZrSiO_4$ (70) (possibly some $\alpha Fe_2O_3$) |
| 8 | 1075 | weak, rust red, translucent to opaque, similar to those of Run 7 | tetra $ZrO_2$ (100), mono $ZrO_2$ (50), + $ZrSiO_4$ (80) (possibly some $\alpha Fe_2O_3$) |

*Fired fibers of this run are depicted in FIG. 1; the fibers of Run 3 had essentially the same appearance as those in FIG. 1, except for color.

EXAMPLE 18

About 1 g. of the black fibers of Example 17 were placed in a loose fashion in a ceramic crucible (1 inch in diameter and 1½ inches in height) and about 15 g. of molten aluminum was poured on the fibers in the crucible and the mixture allowed to cool to form a fiber-reinforced aluminum composite. Upon examination under a binocular microscope, the fibers in the aluminum matrix appeared gold in color and to have been wetted by the aluminum. The gold color was apparently caused by reoxidation of the reduced iron oxide when the latter was heated by the molten aluminum exposed to the air.

EXAMPLE 19

The action of various common reagents on extruded, 800°C.-fired fibers of Example 14 was determined.

After 48 hrs. immersion in a concentrated hydrochloric acid bath at room temperature, the fibers were still gold in color, flexible and appeared unchanged, though the acid bath was yellowish. The acid treated fibers were washed with water and immersed in fresh concentrated hydrochloric acid; after 48 hrs., the fibers were still gold in color, flexible, and apparently unchanged, and the acid bath was essentially colorless; after 8 additional days of immersion, the fibers and acid bath appeared unchanged.

When another batch of the extruded 800°C.-fired fibers was immersed in 28 wt. percent aqueous sodium hydroxide, after one week the fibers still appeared gold, but were brittle and fragile, though the caustic bath was colorless.

EXAMPLE 20

A viscous concentrate was made like that of Example to prevent contact of the fibers with one another due to currents of air (78°F., 56% RH) in the room. The fibers were drawn by and wound on a drum having a peripheral speed of 700 ft./min., the drawn fibers having a diameter of about 15 $\mu$. The fibers were fired in air from room temperature to 800°C. and held at 800°C. for 1 hr. The fired fibers were strong and flexible and under a binocular microscope, were gold in color, clear, transparent and round.

A 1.5 × 12 inches piece of fabric was woven from the fired fibers by a procedure similar to that used in Example 10, using IMS Silicon Spray S512 as a size on the hanks to facilitate weaving. The fabric was uniformly and tightly woven. The fabric was placed in a 500°C. furnace and heated in air to 820°C. over a 1.5 hr. period. The fired fabric was gold in color, shiny, and very flexible, the diameter of the fibers in the fired fabric being uniformly about 13–15 $\mu$ in diameter.

The fired fabric was placed in a tube furnace which was hotter in the middle than at the ends, and the fabric was heated in air, the temperature in the middle of the furnace being about 950°C. or above. The resulting fabric had a gradation in color from one end to the other, ranging from a metallic copper-red at one end (which was near the center of the furnace) to a metallic gold at the other end. Portions of the fabric had become overheated in the furnace and were dull reddish-brown, brittle and fragile, the other portions being flexible and having the gradation described above.

EXAMPLE 21

A viscous concentrate having a viscosity of 580,000 cps., equivalent 58.4 percent solids and $1ZrO_2:1SiO_2$, was prepared like that of Example 20. The concentrate was spun into fibers from a spinnerette having 20 3-mil round orifices, using a spinnerette pressure of 775 psi. The spun fibers were drawn in air (75°F., 30% RH) using a take-up drum having a peripheral speed of 300 ft./min. Some of the spun fibers were fired in air from room temperature to 850°C. over a 5 hr. period and then held at 850°C. for 1 hr. The fired fibers were flexible, gold in color, and under a binocular microscope appeared clear, transparent, smooth and round with diameters of 15–20 $\mu$. A 4 × 6 inch piece of fabric was woven from some of these fibers and fired in air to 800°C. to burn off organic size (IMS Silicon Spray and rubber-oil) used in weaving. The fired fabric was flexible and gold in color with a metallic sheen.

Other portions of the spun fibers were fired in air from room temperature to 900°C. and held at 900°C. for 1 hr. These fibers were then refired in hydrogen from room temperature to 770°C. and held at 770°C. for 2 hrs. The resulting fibers were black in color, opaque, shiny, flexible, and were attracted by a permanent magnet. The fired black fibers were sized with the same rubber-oil mixture used in Example 10 and woven to form a 3 inch × 4.5 inch piece of black fabric. The sizing was removed from the fabric by washing it in toluene. The black fabric, like the black fibers from which it was made, was shiny and flexible and was attracted to a magnet. The application of an oxypropane torch to a portion of the black fabric produced a ⅜ inch gold spot. When the end of a ⅜ inch O.D. copper tube heated in a bunsen burner flame was applied to the black fabric, a gold ring was formed. A platinum-rhodium wire, heated to a bright red color and shaped in the form of the letter "S", when applied to the black fabric for about 0.5 min., "branded" a gold-colored "S" on the fabric. When similarly branded with an even hotter wire, a copper-gold colored brand formed on the fabric.

EXAMPLE 22

A dispersion of colloidal silica in an aqueous zirconium diacetate was made by mixing 5.88 g. of $CoCl_2 \cdot 6H_2O$, 200 g. of colloidal silica (Ludox AM), and 560 g. of aqueous zirconium diacetate. The dispersion was filtered through a Whatman No. 54 filter paper and concentrated under vacuum, using a 30°–40°C. water bath. The resulting viscous concentrate ($1ZrO_2:1SiO_2$) was spun using a spinnerette having six 3-mil, round orifices and a spinnerette pressure of 120 psi. The fibers as spun were drawn and wound by a take-up drum having a speed of 400 ft./min. These fibers were continuous, straight, flexible, and lavender in color and, under a binocular microscope, appeared clear, transparent, and round. When fired in air from room temperature to 500°C., the fibers remained flexible and were very light lavender in color and under a binocular microscope appeared clear, transparent, and round. Refiring the fibers in air for ½ hr. at 800°C. and then refiring them in air to 950°C. also produced fibers which were flexible, still light lavender in color after both refirings and, under a binocular microscope, were clear and transparent, and round.

EXAMPLE 23

Continuous, straight, flexible fibers were produced from a dispersion prepared and spun like that of Example 22, except that twice as much $CoCl_2 \cdot 6H_2O$ was used (i.e. 11.8 g.), and the drawn fibers were wound at a rate of 220 ft./min. As spun, the fibers were lavender-blue in color and, under a binocular microscope, clear, transparent and round. When fired in air from room temperature to 900°C., the fired fibers were flexible and slightly darker than those of Example 22 with the blue color more pronounced, and were still clear, transparent and round under a binocular microscope.

EXAMPLE 24

A dispersion of colloidal silica in aqueous zirconium diacetate was made by mixing 600 g. of colloidal silica (Ludox LS) and 1,683 g. of aqueous zirconium diacetate. After stirring the mixture for about 15 min., it was vacuum concentrated for about 11 hrs., using a 40°C. water bath. The resulting concentrate ($1ZrO_2:1SiO_2$, 70,000 cps.), was spun from a spinnerette having 10 4-mil round orifices, using a spinnerette pressure of 250–300 psi. The fibers as spun were drawn in air (79°F., 32% RH) and wound on a take-up drum having a speed of 300 ft./min. Coils of these fibers were placed in an autoclave and heated for about 2 hrs. to 400°C. under a purged helium atmosphere of about 1,000 psi. The autoclave heat was turned off and pressure released, allowing the fibers to cool. The fired fibers were opaque and black in color. Part of these black fibers were heated in air from room temperature to 500°C., and held at 500°C. for about 2 hrs., the resulting fired fibers being fairly strong and water clear and transparent under a binocular microscope.

The black fibers autoclaved at 400°C. were found to be very porous, with a surface area of 188 $m^2/g.$, and the fibers refired to 500°C. in air were also found to be very porous, with a surface area of 146 $m^2/g.$ (these surface area measurements being made by the continuous BET nitrogen adsorption method). Said refired fibers were also found to have a density of 2.08 g/cc. (as determined by mercury porosimetry), indicating the fibers had a pore volume of about 40–50 percent. The modulus of elasticity of these refired fibers was in the range of 3 to 4 × $10^6$ psi, and they were very flexible.

Said fibers refired at 500°C. were evaluated as adsorptive packing material for a gas chromatographic column as follows. A portion of said refired fibers were packed in straight glass tubes (¼ inch O.D., 1⅓ feet long) and the packed tubes installed in a Hewlett-Packard gas chromatograph (Model 810), using a thermal conductivity detector. The packed columns were evaluated by injecting various samples of gaseous mixtures and liquid mixtures into the input ends of the columns, operating the columns with normal through-put of helium carrier gas at various temperatures from ambient to 250°C., and observing the time required for each component of the sample mixtures to pass through the packed columns and register on the detector. Operation at ambient temperature resulted in selective retention and separation of $C_1$ to $C_4$ hydrocarbon gases of a natural gas sample, and various halocarbon compounds present in Freon 12 and Freon 113 samples. Operation at 250°C. resulted in retention and separation of various $C_6$ to $C_9$ hydrocarbon in a sample of mixed n-alkanes, and retention but incomplete separation of $C_2$ to $C_{10}$ alcohols in a sample of mixed aliphatic alcohols. Returning the column to ambient temperature operation after conditioning it at 250°C. for 40 hrs. gave the usual increase in retentivity. These results show that the refractory fibers exhibit adsorptive properties similar to conventional adsorptive packings of alumina, silica gel, and charcoal. Similar useful results were obtained by using the same refractory composition in granular form as an absorptive material.

EXAMPLE 25

Unfired or green fibers of Example 21 were heated in an autoclave to 400°C. and held at 400°C. for 1 hr. under a purging helium atmosphere at a pressure of 1,000 psi in the manner of Example 24. The autoclaved fibers were fired in air from room temperature to 500°C. and held 2 hrs. at 500°C. The resulting fired fibers were predominantly gold in color, flexible and under a binocular microscope, transparent with a few small areas of which were copper in color and translucent to opaque. These fibers were found to have a surface area of 138 $m^2/g$. (as measured by the BET nitrogen adsorption method), showing them to be quite porous.

EXAMPLE 26

A first batch of an aqueous dispersion of silica was prepared by adding 1.7 liters of colloidal silica (Ludox SM-30) to 2 liters of aqueous zirconium diacetate, and stirring the mixture for about 1 hr. A second batch was prepared similarly by adding 7.1 liters of said colloidal silica to 8.1 liters of said aqueous zirconium diacetate. These two batches were then mixed together and vacuum concentrated in a steam-heated vessel to a viscosity of $7 \times 10^6$ cps. The viscosity of this concentrate was lowered by the addition of water and reconcentrated to 340,000 cps.

The above-prepared concentrate, having a viscosity of 340,000 cps and an equivalent $ZrO_2:SiO_2$ mole ratio of 1:2.2, was extruded through five 26-gauge hypodermic needles (parallel spaced on 0.5 inch centers) under a pressure of 400 psi, the fibers as extruded being blown by impinging streams of air under pressure meeting at the outlet ends of the needles. The impinging streams of air were supplied from two ½ inch ID pipe spaced 1⅝ inch apart on center, each pipe having fifteen 0.040 diameter holes spaced ¼ inch apart. The pipes were set back from the outlet ends of the needles and positioned perpendicular thereto, one such pipe being above the needles and the other below the needles. The extruded fibers were blown in this manner onto a carrier web and deposited thereon in the form of a non-woven mat. A plurality of mats were made in this fashion. When the blowing streams of air were applied at 10 psi., the resulting blown fibers were about 1 to 2 inches in length and had a diameter of about 0.001 inch. As the blowing air pressure increased, the blown extruded fibers had a diameter of 0.0005 to 0.00025 inch. The mats were from 1/32 to ⅛ inch in thickness and looked like spun white cotton. The green mats were fired in air from room temperature to 500°C. and held at 500°C. for 30 to 60 min. A portion of these fired mats were refired in air at 1,000°C. for 1 hr. The 500°C.-fired mats were flexible and stronger than the unfired or green mats. The 1,000°C.-fired mats were still flexible but more rigid than the 500°C.-fired mats. The fibers of the 500°C.-fired mats and the 1,000°C.-fired mats, when viewed under a microscope, were water clear and transparent and the continuous fibers at their points of intersection appeared fused much like fused glass joints.

EXAMPLE 27

Fibers were prepared in the same manner as Example 24, except that the fibers were merely extruded from the spinnerette (that is, they were not drawn by a take-up drum). The extruded fibers were allowed to fall 2 ft. by their own weight and collect in a random fashion on a paper substrate to form a mat. These fibers had diameters of about 0.002 inch and were fairly wet with individual fibers being bonded together. A portion of the mat was fired in air from room temperature to 500°C. and held at 500°C. for ½ hr. The resulting fired mat was stiff and rather brittle, but the fibers in the mat did not break up during the firing. A portion of the 500°C.-fired mat was refired in air to 1,000°C. for 1 hr. and after firing was smooth and tough. Under a binocular microscope, the fibers were water clear, transparent, and round, and like in Example 26, the intersecting points of the fibers in the mats looked like fused glass joints, but they were continuous rather than short fibers.

EXAMPLE 28

A dispersion of colloidal silica was prepared by dissolving 1.78 g. of $CuCl_2 \cdot 2H_2O$ in water and adding it to 40 g. of colloidal silica (Ludox AM), and stirring the resulting mixture into 112 g. of aqueous zirconium acetate. The mixture was further mixed in a high shear mixer and vacuum concentrated in a rotating flask in 30°–40°C. water bath. The resulting viscous concentrate ($1ZrO_2:1SiO_2$) was clear dark blue. Fibers spun from this concentrate were fired in air from room temperature to 900°C., the resulting fired fibers being flexible, light green in color and, under a binocular microscope, clear, transparent, and round.

Various modifications and alterations of this invention will become apparent to those skilled in the art without departing from the scope and spirit of this invention, and it should be understood that this invention is not to be unduly limited to the illustrative embodiment set forth herein.

I claim:

1. A solid, transparent, essentially zircon-free refractory fiber, round in cross-section, comprising a mixture of microcrystalline zirconia in predominantly its tetragonal form and amorphous silica, the mole ratio of zirconia to silica in said fiber being on the range of 1.5:1 to 1:2.

2. Refractory fiber according to claim 1, wherein the mole ratio of zirconia to silica is about 1:1.

3. Refractory fiber according to claim 1, having a density of 1.5 to 4.3 grams per cubic centimeter.

4. Refractory fiber according to claim 1 having a modulus of elasticity of less then $25 \times 10^6$ psi.

5. Refractory fiber according to claim 1 having a modulus of elasticity of 7 to $20 \times 10^6$ psi.

6. Refractory fiber according to claim 1, further comprising a metal oxide.

7. Refractory fiber according to claim 1, further comprising 0.5 to 25 weight percent of a metal oxide, based on the total weight of said zirconia and silica.

8. Refractory fiber according to claim 1, further comprising an amount of a metal oxide sufficient to impart a color thereto.

9. Refractory fiber according to claim 1 further characterized as being round, straight, and continuous.

10. Textile comprising fiber of claim 1.

11. Woven fabric comprising fiber of claim 1.

12. Woven fabric comprising fiber of claim 1 and capable of having its color or tone changed by the application of heat in an oxidizing or reducing atmosphere.

13. Non-woven textile comprising fiber of claim 1.

14. A mat comprising fiber of claim 1.

15. An essentially zircon-free, solid, transparent refractory fiber round in cross-sections, comprising a mixture of microcrystalline zirconia and amorphous silica, said zirconia being essentially the sole zirconium compound in said refractory and predominantly present in its tetragonal form, the mole ratio of zirconia to silica in said refractory being about 1:1.

16. A product comprising a plurality of the fibers of claim 15.

17. A method comprising extruding in air in the form of fiber a liquid composition comprising an aqueous mixture of colloidal silica and zirconia compound capable of being calcined to zirconia, the mole ratio of equivalent zirconia to silica in said liquid composition being in the range of 1.5:1 to 1:2, said liquid having an equivalent solids content of 15 to 55 weight percent, heating the resulting gelled fiber to remove water, organic material, and carbon therefrom and form refractory fiber, and heating the latter at an elevated temperature in the range of 900° to 1,150°C. for a sufficient period of time to form solid, transparent, essentially zircon-free refractory fiber comprising a mixture of microcrystalline zirconia in predominantly its tetragonal form and amorphous silica.

18. The method according to claim 17, wherein said elevated temperature is in the range of 950° to 1,050°C.

19. The method according to claim 17, wherein the mole ratio of zirconia to silica in said liquid composition and in said refractory fiber is 1:1.

20. The method according to claim 17, wherein said liquid composition has a viscosity of 45,000 to 500,000 cps.

21. A method for forming fibers made of a transparent, solid, essentially zircon-free refractory comprising a mixture of microcrystalline zirconia in predominantly its tetragonal form and amorphous silica, the mole ratio of zirconia to silica in said refractory being about 1:1, which method comprises extruding through orifices a viscous liquid comprising a dispersion of colloidal silica in an aqueous solution of zirconium diacetate, drawing the resulting fibers in air, heating the drawn fibers in air to remove water, organic material, and carbon therefrom and form refractory, and further heating the latter at 900° to 1,150°C. for a sufficient time to form said refractory fibers.

* * * * *

UNITED STATES PATENT OFFICE
CERTIFICATE OF CORRECTION

Patent No. 3,793,041          Dated Feburary 19, 1974

Inventor(s) Harold G. Sowman

It is certified that error appears in the above-identified patent and that said Letters Patent are hereby corrected as shown below:

Column 3, line 3, "though" should read -- thought --;

Column 3, line 44, "0.06 0.06" should read -- 0.06 --;

Column 3, line 57, "preseent" should read -- present --;

Column 5, line 37, "49.0" should read -- $\geq$49.0 --;

Column 6, line 17, "technique" should read -- techniques --;

Column 6, line 63, "articles form" should read -- articles from --;

Column 7, line 12, "oblique of" should read -- oblique or --;

Column 7, line 19, "andd" should read -- and --;

Column 8, line 16, "40 percent" should read -- 40 weight percent --;

Column 10, line 54, "trnasformation" should read -- transformation --;

Column 11, line 6, "X-ay" should read -- X-ray --;

Column 14, line 55, "proprianate." should read -- propionate, --;

Column 15, line 63, "sample" should read -- samples --;

UNITED STATES PATENT OFFICE
CERTIFICATE OF CORRECTION

Patent No. 3,793,041         Dated February 19, 1974

Inventor(s) Harold G. Sowman

It is certified that error appears in the above-identified patent and that said Letters Patent are hereby corrected as shown below:

Column 16, line 26, "though" should read -- through --;

Column 16, lines 34, 35, "attenutation" should read -- attenuation --;

Column 18, line 57, "7.4" should read -- 7.5 --;

Column 19, line 28, the Run between Runs 5 and 7 should be read as Run -- 6 --;

Column 20, line 34, "800" should read -- $\geq$ 800 --;

Column 25, in Table IV, the heading for the second column should read: Equiv $ZrO_2:SiO_2$ mole ratio

UNITED STATES PATENT OFFICE
CERTIFICATE OF CORRECTION

Patent No. 3,793,041　　　　Dated February 19, 1974

Inventor(s) Harold G. Sowman

It is certified that error appears in the above-identified patent and that said Letters Patent are hereby corrected as shown below:

Columns 25 and 26, the following should appear as part of Table IV between lines 19 and 20:

| | | | | | | | |
|---|---|---|---|---|---|---|---|
| 5 | 1:1 | water clear & transparent | transparent & slightly milky | opaque white (milky transparent) | clear tan & transparent (opaque blk.) | translucent to white opaque (opaque blk.) | opaque white, grainy |
| 6 | 1:1 | water clear, transparent | transparent & slightly milky[d] | transparent & slightly milky to opaque white | water clear, transparent | transparent slightly milky | opaque white, grainy |
| 7 | 1:1.5 | - | - | - | - | - | - |
| 8 | 1:2 | - | - | - | - | - | - |
| 9 | 1:3 | - | - | - | - | - | - |

Column 25, line 43, the entry "sintered" under column VII for Run 8 should read -- sintered[e] --;

Column 25, line 60, "Crystallite size A" should read -- Crystallite size, A --;

UNITED STATES PATENT OFFICE
CERTIFICATE OF CORRECTION

Patent No. 3,793,041　　　　　　Dated February 19, 1974

Inventor(s) Harold G. Sowman

Figure 2:
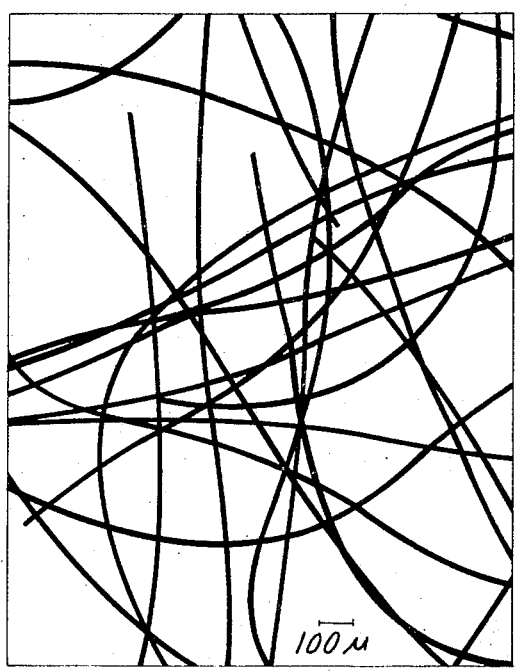
FIG. 2 represents opaque fibers, photographed at 50X with transmitted light, obtained by firing at 1,075°C. fibers comprising $1ZrO_2:1SiO_2:0.06$ $0.06Fe_2O_3$.

It is certified that error appears in the above-identified patent and that said Letters Patent are hereby corrected as shown below:

Column 25, line 63, the entry "$10^3$" for Run 2, Firing Schedule V, should read -- $\geq 10^3$ --;

Column 29, line 4, "800°C.-fired C. fibers" should read -- 800°C.-fired fibers --;

Columns 29 and 30, after line 31, the following two footnotes should appear at the bottom of Table VII:

-- \*\*Fired fibers of this run are depicted in FIG. 2.

\*\*\*X-ray diffraction did not reveal presence of $SiO_2$, thus it was apparently present in amorphous form, except where in Runs 7 and 8 a portion of it was combined in the form of zircon. --;

Column 34, line 55, "then" should read -- than --.

Signed and sealed this 9th day of July 1974.

(SEAL)
Attest:

McCOY M. GIBSON, JR.　　　　　　C. MARSHALL DANN
Attesting Officer　　　　　　　　Commissioner of Patents